(12) United States Patent
Tanguay et al.

(10) Patent No.: US 11,730,219 B1
(45) Date of Patent: Aug. 22, 2023

(54) CONTINUOUS IN-LINE FABRIC JOINING

(71) Applicant: CreateMe Technologies LLC, New York, NY (US)

(72) Inventors: Michael William Tanguay, Camas, WA (US); Nicholas Chope, Portland, OR (US)

(73) Assignee: CreateMe Technologies LLC, New York, NY (US)

( * ) Notice: Subject to any disclaimer, the term of this patent is extended or adjusted under 35 U.S.C. 154(b) by 0 days.

(21) Appl. No.: 17/710,870

(22) Filed: Mar. 31, 2022

(51) Int. Cl.
| | |
|---|---|
| *A41H 43/04* | (2006.01) |
| *D05B 37/04* | (2006.01) |
| *B29C 65/48* | (2006.01) |
| *B29C 65/72* | (2006.01) |
| *B29C 65/08* | (2006.01) |
| *B29C 65/78* | (2006.01) |
| *B29C 65/00* | (2006.01) |
| *D05B 27/00* | (2006.01) |

(52) U.S. Cl.
CPC .............. *A41H 43/04* (2013.01); *B29C 65/08* (2013.01); *B29C 65/48* (2013.01); *B29C 65/72* (2013.01); *B29C 65/7802* (2013.01); *B29C 65/787* (2013.01); *B29C 66/80* (2013.01); *B29C 66/83* (2013.01); *D05B 27/00* (2013.01); *D05B 37/04* (2013.01)

(58) Field of Classification Search
CPC ....... B29C 65/08; B29C 65/787; B29C 66/83; B29C 65/7802; A41H 43/04; B25J 15/0019
See application file for complete search history.

(56) References Cited

U.S. PATENT DOCUMENTS

| | | | | |
|---|---|---|---|---|
| 5,403,413 | A | * 4/1995 | Masuda | ............. B29C 66/8322 156/304.6 |
| 5,614,057 | A | * 3/1997 | Conley, Jr. | .......... B29C 66/1122 156/502 |
| 8,020,502 | B2 | 9/2011 | Hanada | |
| 10,105,789 | B2 | 10/2018 | Wang et al. | |
| 10,895,030 | B1 | 1/2021 | Baker et al. | |
| 2012/0102615 | A1 | 5/2012 | Dickerson | |

FOREIGN PATENT DOCUMENTS

WO    WO-2021001723 A1 *   1/2021   ............. B29C 65/08

* cited by examiner

*Primary Examiner* — Carson Gross

(57) ABSTRACT

A garment station including a first guide separated from a second guide by a repositionable gap. The garment station further includes a head carrier disposed between the first guide and the second guide. The garment station further includes a first tool head and a second tool head attached to the head carrier and configured to join webs of fabric disposed across the gap. The head carrier is configured to maintain the first tool head and the second tool head aligned in the gap as the gap is repositioned.

20 Claims, 17 Drawing Sheets

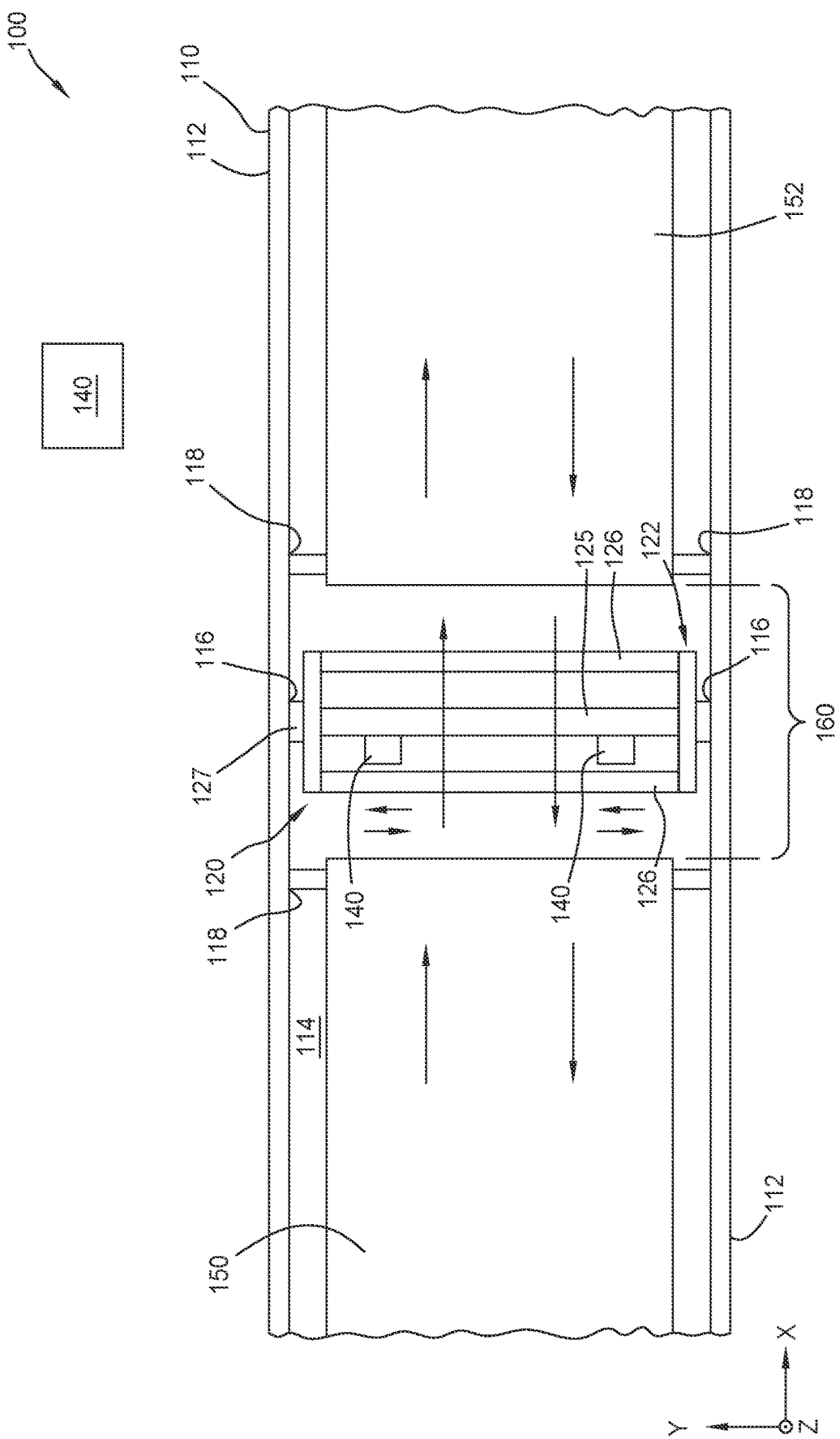

CONTINUOUS IN-LINE FABRIC JOINING

BACKGROUND

Despite technological advances and introduction of automation in many types of manufacturing, garment manufacturing remains very labor intensive. Sewing machines were invented in the early nineteenth century and were made possible based on the development of the lock stitch sewing technique. Today, some hundred fifty years later, this same technology remains the foundation of garment manufacturing. The modern process of producing large quantities of ready-to-wear apparels relies heavily on manual labor and remains inefficient relative to other industrial manufacturing processes. Garment manufacturing includes multiple steps including sizing, folding, fitting, cutting, sewing, and material handling. The type of tasks needed dictates the level of skilled labor that is required to perform the work. The unique and varied properties of fabric such as weight, thickness, strength, stretch and drape as well as the complicated nature of tasks required in apparel manufacturing complicates material handling and automated garment manufacturing.

In most small and large apparel manufacturing factories, most of the material handling and apparel manufacturing operations are conducted in a manual or semi-manual manner. The garment manufacturing process may start with laying out a web of fabric for 24 hours to relax the fabric and remove wrinkles. Then, one or more layers of fabric may be cut based on patterns and dimensions matching the desired garment. Then, the cut fabric pieces are transferred from workstation to workstation, where at each workstation, one, two, or more pieces of fabrics are manually folded, overlapped along the seams, and fed into a sewing machine or serger machine (also referred to as an overlock machine). Given the variety of fabrics, threads, seam types, and stitch types found in a finished garment, a larger number of workstations with specialized tools and skilled operators is required for assembling a garment. This means the fabrics or unfinished garments spend much time in transit between workstations, which adversely affects the time required to complete a garment. Thus, traditional apparel manufacturing operations may include multiple sequential processes. Further, a time constant may be required between each operation to allow the fabric to relax, which further increases the time required to process a garment.

Despite advances in technology, machines still struggle with performing certain tasks that are easily handled by a trained worker with average hand-eye coordination skills. This is one reason the garment manufacturing industry is in a constant search of cheaper, human labor rather than investing in advanced automated manufacturing systems. To increase production, a factory may add additional production lines in parallel, which does little to improve efficiency. Even in large factories, most work is performed in piecemeal fashion, with limited coordination between various stations/steps, and movement of material between each station requires a great deal of manual product handling.

Accordingly, there is a need for an automated system for manufacturing garments to increase efficiency and reduce reliance on manual labor.

SUMMARY

In one embodiment, a garment station includes a first guide separated from a second guide by a repositionable gap. The garment station further includes a head carrier disposed between the first guide and the second guide. The garment station further includes a first tool head and a second tool head attached to the head carrier and configured to join webs of fabric disposed across the gap. The head carrier is configured to maintain the first tool head and the second tool head aligned in the gap as the gap is repositioned.

In one embodiment, a method of making a garment component includes advancing at least two webs of fabric material across gap between a first guide and a second guide. The method further includes joining the two webs of fabric material while the at least two webs of fabric material spans the gap. The method further includes moving the gap while joining the at least two webs of fabric material.

In one embodiment, a garment station includes a frame, a first conveyor, a second conveyor, a head carrier, a first tool head, and a second tool head. The first conveyor is movably coupled to the frame. The second conveyor is movably coupled to the frame and separated from the first conveyor by a repositionable gap. The head carrier moveable relative to the frame and disposed in the repositionable gap and including a slot, wherein the first and second conveyors are moveable relative to the frame to reposition the gap in response to the head carrier moving relative to the frame. The first tool head and the second tool head are moveably attached to the head carrier on opposing sides of the slot. The first and second tool heads are configured to join webs of fabric disposed across the gap and disposed in the slot as the head carrier moves relative to the frame.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 1A is a top view of a garment station.

DETAILED DESCRIPTION

Figure 1B:
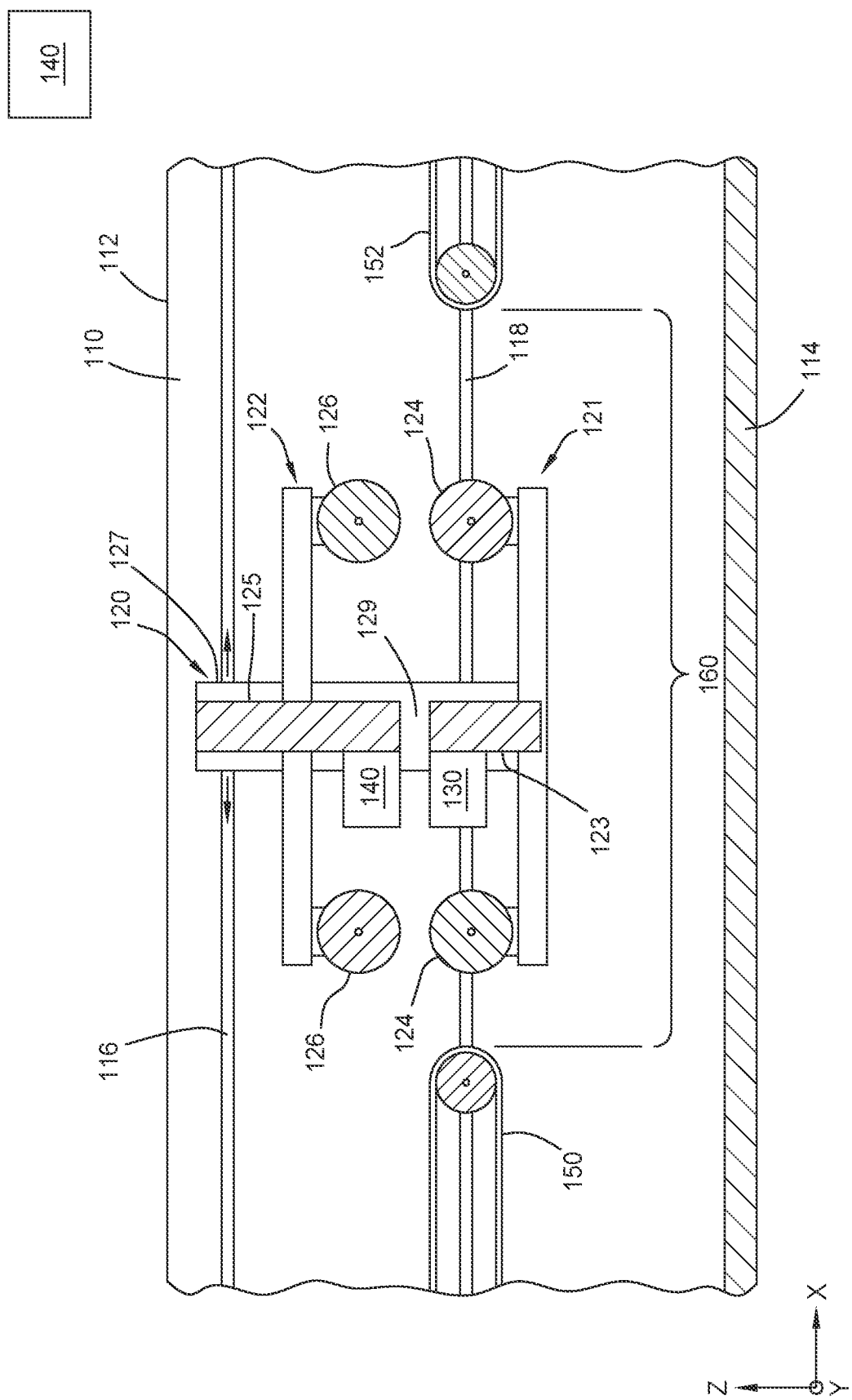
FIG. 1B is a cross-sectional view of the garment station shown in FIG. 1A.

FIGS. 1A-1H are schematic illustrations of an exemplary garment station 100 for joining sections of fabric together using one or more seams. The fabric sections may be cut portions of fabric or one or more webs of fabric. The seams may be made using ultrasonic welding, sewing, or other suitable technique. Beneficially, the seams are formed while the sections of fabric are advanced across the garment station 100, thus significantly improving throughput over conventional garment fabrication machines.

In one or more examples, the garment station 100 includes a frame 110, a head carrier 120, at least one first tool head 130, and at least one second tool head 140, and a controller 190. The garment station 100 also includes at least two guides with a repositionable gap 160 disposed therebetween. The two guides are shown as a first conveyor 150 and a second conveyor 152 separated by a repositionable gap 160. An X/Y/Z coordinate system has been provided in the Figures to more clearly describe the components of the garment station 100. The x-direction is aligned with the direction of conveyance down the length of the conveyors 150, 152, while the y-direction is aligned perpendicularly across the width of the conveyors 150, 152. The z-direction is generally aligned with the vertical direction. The length of the conveyors 150, 152 are generally aligned in the x-direction such that material, such as one or more webs or sections of fabric may be transferred from the first conveyor 150 to the second conveyor 152.

As shown in FIGS. 1A and 1B, the frame 110 includes side members 112, a floor 114, head carrier tracks 116, and conveyor tracks 118. In some embodiments, the floor 114 may be omitted. Each head carrier track 116 and each conveyor track 118 may be disposed on or integral with a respective side member 112. The head carrier 120 is engaged with the head carrier tracks 116. The head carrier 120 is moveable relative to the frame 110 along the head carrier tracks 116 to positions on the x-axis. The head carrier tracks 116 may be motorized to move the head carrier 120 along the head carrier tracks 116. In some embodiments, the head carrier 120 includes one or more motors or other actuators to move the head carrier 120 along the head carrier tracks 116. The head carrier 120 is positionable over at least a portion of the first conveyor 150, at least a portion of the second conveyor 152, and in a gap 160 defined between the conveyors 150, 152. The first tool head 130 and the second tool head 140 are attached to the head carrier 120 and travel with the head carrier 120 as the head carrier 120 moves along the head carrier tracks 116. The first tool head 130 and the second tool head 140 interact with each other to join the fabric sections being conveyed by the conveyors 150, 152.

The head carrier 120 moves along the head carrier tracks 116 to move the first tool head 130 and the second tool head 140 to positions on the x-axis. The first conveyor 150 and second conveyor 152 are engaged with the conveyor tracks 118. The first conveyor 150 and the second conveyor 152 are moveable relative to the frame 110 along conveyor tracks 118 to positions on the x-axis. The conveyor tracks 118 may be motorized to move each conveyor 150, 152 along the conveyor tracks 118. The conveyors 150, 152 may each include a motor assembly or other actuators to move each conveyor 150, 150 along the conveyor tracks 118. The first conveyor 150 may also move along the x-axis at the same or different rates relative to one or both of the frame 110 and second conveyor 152. Also, the second conveyor 152 may move along the x-axis at the same or different rates relative to one or both of the frame 110 and the first conveyor 150. The conveyors 150, 152 may move in the same or opposite directions along the x-axis at the same time.

The repositionable gap 160 is defined between the first conveyor 150 and the second conveyor 152. The first conveyor 150 and the second conveyor 152 guide the webs of fabric across the gap 160. The sections of fabric being transported by the first conveyor 150 spans the gap 160 to the second conveyor 152 as the fabric moves through the garment station 100. The gap 160 allows the first tool head 130 access to the underside of one or more webs of fabric traveling through the garment station 100. The gap 160 is repositionable along the x-axis as the conveyors 150, 152 move. For example, if both conveyors 150, 152 move in the same direction along the x-axis, the gap 160 also moves in the same direction. If both conveyors 150, 152 are moving at the same rate in the same direction along the x-axis, the width across the gap 160 between the conveyors 150, 152 remains constant as the gap 160 moves in the same direction as the conveyors 150, 152. Similarly, if both conveyors 150, 152 are moving at the different rates in the same direction along the x-axis, the width across the gap 160 between the conveyors 150, 152 will increase or decrease depending on which conveyor 150, 152 is moving faster as the gap 160 moves in the same direction as the conveyors 150, 152. Additionally, if both conveyors 150, 152 are moving in opposite directions along the x-axis, the width across the gap 160 and the direction the gap 160 will change commensurate with the rate and direction of travel of each conveyor 150, 152.

In some embodiments, and as shown in FIGS. 1A-1H, the head carrier 120 is a gantry. The head carrier 120 is generally maintained in the gap 160 as the gap 160 moves as described above. As the head carrier 120 is positioned in the gap 160, the first and second tool heads 130, 140 can freely access the sections of fabric spanning across the gap 160 such that the heads 130, 140 can form a seam in the material without interference from the conveyors 150, 152. The conveyors 150, 152 are moved along the conveyor tracks 118 to translate the gap 160 in coordination with the movement of the head carrier 120 along the head carrier tracks 116. Translating the gap 160 in coordination with the movement of the head carrier 120 allows the tool heads 130, 140 to form the seam without interference from the conveyors 150, 152 as the fabric travels through the garment station 100 from the first conveyor 150 to the second conveyor 152. Stated differently, the gap 160 moves as needed to maintain the tool heads 130, 140 adjacent to the portion of the fabric in which the seam is being formed as the fabric moves between conveyors 150, 152.

FIG. 1B illustrates a partial cross-sectional view of the garment station 100 along a centerline of the garment station 100. As shown in FIG. 1B, the head carrier 120 includes a first body 121 and a second body 122. The first body 121 and second body 122 move synchronously with each other as the head carrier 120 moves along the head carrier tracks 116. A slot 129 is disposed between the first body 121 and second body 122. Webs of fabric may be conveyed through the slot 129 as the fabric moves between conveyors 150, 152 across the gap 160. The webs of fabric may contact the slot 129 or the slot 129 may be sized such that the fabric does not contact the slot 129. The first tool head 130 is attached to the first body 121 and the second tool head 140 is attached to the second body 122 on opposing sides of the slot 129. The head carrier 120 may also include connection members 127, such as a post as shown in FIGS. 1A-1B, which connects the first body 121 to the second body 122. Each connection member 127 may be engaged with a corresponding head carrier track 116. The head carrier 120 may also include an actuator (not shown) to move the second body 122 relative to the first body 121 in the direction of the z-axis.

The first body 121 includes a first track section 123. The first body 121 supports at least one first roller 124. The first roller 124 may be two or more rollers as shown in FIG. 1B. The first track section 123 includes a first track (not shown), and the first tool head 130 is moveable laterally relative to the frame 110 along the first track section 123 to positions on the y-axis. The first tool head 130 may include one or more motors or other actuators to move the first tool head 130 along the first track section 123. The second body 122 includes a second track section 125. The second body 122 supports at least one second roller 126. The second roller 126 may be two rollers as shown in FIG. 1B. The second track section 125 includes a second track (not shown), and the second tool head 140 is moveable laterally relative to the frame 110 along the second track section 125 to positions on the y-axis. The second tool head 140 may include one or more motors or other actuators to move the second tool head 140 along the second track section 125.

Figure 1C:
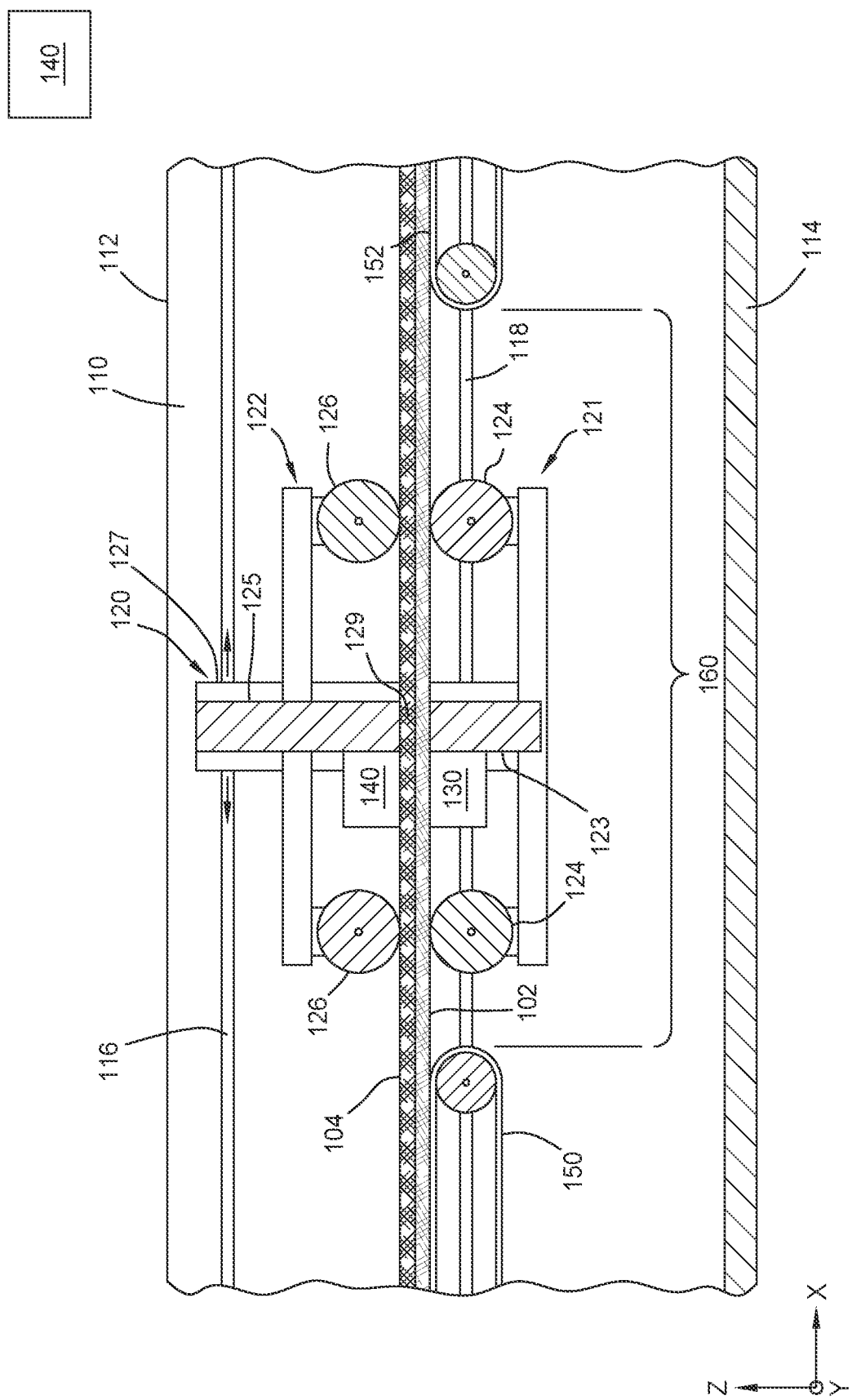
FIG. 1C is the cross-sectional view of the garment station shown in FIG. 1B including two webs disposed therein.

FIG. 1C illustrates a partial cross-sectional view of the garment station 100 with a first web 102 of fabric and a second web 104 of fabric traveling through the garment station 100 on the conveyors 150, 152. The first and second webs 102, 104 move on the conveyors 150, 152 along the x-axis across the gap 160. As shown in FIG. 1C, the first web 102 and the second web 104 pass through the slot 129. The first web 102 is engaged with the first rollers 124 and the second web 104 is engaged with the second rollers 126. The first and second rollers 124, 126 support the first and second webs 102, 104 as the webs 102, 104 travel through the slot 129 in the head carrier 120. For example, the first and second rollers 124, 126 may keep the first and second webs 102, 104 substantially parallel to the x-axis with minimal sagging in the portion of the first and second webs 102, 104 between the first and second rollers 124, 126. The first rollers 124 are positioned to suspend the first web 102 above the first tool head 130 to allow the first tool head 130 to move relative to the first web 102 as the first tool head 130 is moved by the head carrier 120 and/or moved along the first track section 123. For example, first rollers 124 may be positioned to allow the first tool head 130 to move relative to the first web 102 without stretching or tearing the first web 102. The first tool head 130 may move relative to the first web 102 to a position on the y-axis along the first track section 123 and the first tool head 130 may move relative to the web first web 102 to a position on the x-axis as the head carrier 120 moves along the head carrier tracks 116. In some embodiments, the first and second rollers 124, 126 may be pinch rollers (also referred to as nip roller) to apply force to maintain the engagement of the webs 102, 104 at an interface 105 between the surfaces of the webs 102, 104 as the webs 102, 104 travel through the head carrier 120. In some embodiments, the first rollers and/or the second rollers 126 may be motorized to pull (e.g., feed or dispense) the first web 102 and second web 104 through the head carrier 120. In some embodiments, the first rollers 124 and/or the second rollers 126 may be disengaged to clear the first web 102 and second web 104 through the head carrier 120.

The first tool head 130 and the second tool head 140 cooperate to form one or more seams to secure the first web 102 to the second web 104. The first tool head 130 and the second tool head 140 may cooperate to form the one or more seams between the webs 102, 104 while the webs 102, 104 are stationary within the garment station 100 or while the webs 102, 104 are traveling relative to the garment station 100 at a web velocity. In one example, the webs 102, 104 may be both indexed between stationary positions (relative to the frame 110) and moved (relative to the frame 110) by the conveyors 150, 152 (and/or pinch rollers 524) while the seam is formed. The one or more seams may be a seam pattern of a garment or a garment component. The one or more seams formed by the heads 130, 140 in a garment or a garment component may be in the form of stitching. In some embodiments, the one or more seams formed by the heads 130, 140 may be in the form of welds formed from ultrasonic welding. In some embodiments, the one or more seams formed by the heads 130, 140 may be in the form of one or more adhesive bonds.

The first tool head 130 and the second tool head 140 move synchronously to positions along the x/y axes to form the one or more seams in the webs 102, 104 of fabric. The head carrier 120 is selectively moveable along the head carrier tracks 116 to move the first tool head 130 and the second tool head 140 to positions on the x-axis to form one or more seams. The first tool head 130 and the second tool head 140 move cooperatively with each other to form the seams as the head carrier 120 moves along the head carrier tracks 116. The first tool head 130 and second tool head 140 are selectively moved together to one or more y-positions along the respective track sections 123, 125 to maintain an alignment to form the one or more seams. The first and second tool heads 130, 140 may form a seam as the tool heads 130, 140 are moved to positions on the x/y axes simultaneously, such as a linear seam formed at an angle to the x-axis. The first tool head 130 and second tool head 140 may form a linear or non-linear seam in the webs 102, 104. The linear seam may be formed in a direction of the x-axis, y-axis, or at an angle relative to the x-axis. For example, the non-linear seam may be a contoured seam (e.g., curved seam), such as a seam that is an arc, or a stepped seam, such as a zig-zag seam.

In some embodiments, the orientation of the first tool head 130 and/or the second tool head 140 relative the x/y axes may be changed to form a linear and/or a non-linear seam. For example, the first tool head 130 and/or the second tool head 140 may be rotated to change the orientation of the first tool head 130 and the second tool head 140. In one example, the orientation of the first tool head 130 and/or the second tool head 140 may be changed during the formation of the seam to create a non-linear seam. In some embodiments, a linear and a non-linear seam can be formed by the tool heads 130, 140 without changing the orientation of the tool heads 130, 140.

The first tool head 130 and the second tool head 140 may first be moved into a position relative to the webs 102, 104 prior to initiating the formation of a seam in the webs 102, 104. The first and second tool heads 130, 140 may be moved to the position by moving the head carrier 120 along the head carrier tracks 116 and moving the first and second tool heads 130, 140 along the first and second track sections 123, 125, respectively.

The garment station 100 may include two or more first tool heads 130 and two or more second tool heads 140. The garment station 100 shown in FIG. 1A includes two second tool heads 140 and two first tool heads 130 (located beneath a respective second tool head 140 and obscured from view by the respective second tool head 140) to create two seams that join the first and second webs 102, 104 simultaneously. The controller 190 controls both first tool heads 130 and both second tool heads 140. Both first tool heads 130 may be engaged with the same track of the first track section 123 or each first tool head 130 may be disposed on a separate track of the first track section 123. Both second tool heads 140 may be engaged with the same track of the second track section 125 or each second tool head 140 may be disposed on a separate track of the second track section 125.

The first conveyor 150 and the second conveyor 152 move the webs 102, 104 through the garment station 100. The first conveyor 150 and the second conveyor 152 also support the webs 102, 104. As shown in FIGS. 1A-1C and discussed above, the gap 160 is disposed between the first conveyor 150 and the second conveyor 152. The head carrier 120 is shown disposed in the gap 160. As shown in FIG. 1C, a portion of the webs 102, 104 spans the gap 160 between the conveyors 150, 152. The gap 160 is translatable in the direction of the x-axis as the conveyors 150, 152 move along the conveyor tracks 118. The conveyors 150, 152 are moved along the conveyor track 118 to translate the gap 160 to accommodate the travel of the head carrier 120 along the head carrier tracks 116. Seams can be made in the portion of the webs 102, 104 spanning the gap 160 by the tool heads 130, 140 as the webs 102, 104 are moved by the conveyors 150, 152. The movement of the head carrier 120 along the head carrier tracks 116 and the movement of the conveyors 150, 152 along the conveyor tracks 118 are coordinated by the controller 190. The conveyors 150, 152 may move synchronously or asynchronously along the conveyor tracks 118. The conveyor 150, 152 and the head carrier 120 may be moved synchronously or asynchronously along the respective tracks 116, 118. The gap 160 may have a fixed distance that is maintained by coordinating the movement of the conveyors 150, 152 along the conveyor track 118. In some embodiments, the distance across the gap 160 in the x-direction may change in size as the distance between the conveyors 150, 152 increases or decreases.

In some embodiments, the conveyors 150, 152 have a fixed length, and the conveyors 150, 152 are translated along the conveyor track 118 to reposition the gap 160 and/or change the size of the gap 160. In some embodiments, the ends of the conveyors 150, 152, such as a roller, may be selectively fixed to the conveyor track 118 or frame 110 to maintain a position of the conveyor 150, 152. In some embodiments, the conveyors 150, 152 have a dynamically adjustable length, and the length can be adjusted to increase or decrease the length of the conveyors 150, 152 to reposition and/or change the size of the gap 160.

The first conveyor 150 and the second conveyor 152 may include belts for moving the webs 102, 104, as shown in FIGS. 1A-1C. In one embodiment, one or both of the first and second conveyor 150, 152 includes at least one motorized roller and does not use a belt to move the webs 102, 104.

The controller 190 controls the position of the head carrier 120, the first tool head 130, the second tool head 140, the first conveyor 150, and the second conveyor 152. The controller 190 may also control the position and velocity of the webs 102, 104 on the conveyors 150, 152. The controller 190 may control the movement and the displacement velocity of the head carrier 120 along the head carrier track 116. The controller 190 may control the movement and displacement velocity of the conveyors 150, 152 along the conveyor track 118 and the belt velocity of the conveyors 150, 152. The controller 190 may control the movement and displacement velocity of the first tool head 130 along the first track section 123 and the movement and displacement velocity of the second tool head 140 along the second track section 125. The controller 190 commands the head carrier 120 to move along the head carrier tracks 116 to move the first tool head 130 and the second tool head 140 to one or more positions on the x-axis. The controller 190 commands the first tool head 130 and the second tool head 140 to move synchronously relative to the head carrier 120 to one or more positions on the y-axis along the respective track sections 123, 125.

The controller 190 coordinates the movement of the head carrier 120, the first tool head 130, the second tool head 140, the first conveyor 150, and the second conveyor 152 to form one or more seams in the webs 102, 104 with the tool heads 130, 140. The controller 190 causes the conveyors 150, 152 to move along the conveyor tracks 118 to translate the gap 160 as the head carrier 120 moves relative to the frame 110 to facilitate forming a seam in the portion of the webs 102, 104 that spans the gap 160 with the tool heads 130, 140. The controller 190 may coordinate the movement of the conveyor 150, 152 along the conveyor track 118 to maintain a fixed distance of the gap 160 as the conveyors 150, 152 move along the conveyor tracks 118. The one or more seams may be formed while webs of fabric, such as webs 102, 104, travel through the garment station at a web velocity.

The controller 190 controls the velocity (e.g., web velocity) of the webs 102, 104 through the garment station 100, including controlling the web velocity while the first tool head 130 and the second tool head 140 form one or more seams in the portion of the webs 102, 104 spanning the gap 160. The controller 190 may maintain or change the web velocity by adjusting the belt velocity of the conveyors 150, 152. The controller 190, for example, may reduce the web velocity by reducing the belt velocity of the conveyors 150, 152. The controller 190 may reduce the web velocity to allow the head carrier 120 to more time to form the seams.

The controller 190 may maintain or change the web velocity while the conveyors 150, 152 move along the conveyor tracks 118 and while the head carrier 120 moves along the head carrier tracks 116. The controller 190 may adjust or maintain a desired velocity of webs 102, 104 (e.g., web velocity) relative to the frame 110 based on the belt velocity of the conveyors 150, 152 and the movement and displacement velocity of the conveyors 150, 152 along the conveyor tracks 118. The controller 190 may maintain or change the web velocity and/or the position and belt velocity of the conveyors 150, 152 to keep the first tool head 130 and second tool head 140 aligned across the gap 160 to form one or more seams in the webs 102, 104 as the webs 102, 104 is move relative to the frame 110 through the garment station 100. In one example, the controller 190 maintains the web velocity by adjusting the belt velocity of the conveyors 150, 152 based on the displacement velocity of the conveyors 150, 152 and/or the direction of the travel of the conveyors 150, 152 relative to the frame 110. The controller may 190 may maintain the web velocity as the as the conveyors 150, 152 move along the conveyor tracks 118 to translate the gap 160 to accommodate the travel of the head carrier 120 relative to the frame 110. The controller 190 may also stop and start the conveyance of the conveyors 150, 152 to selectively stop and start the throughput of the webs of fabric through the garment station 100. For example, the controller 190 may stop the conveyance of the conveyors 150, 152 by stopping the movement of the belt of the conveyors 150, 152 while the seam is being formed by the tool heads 130, 140.

The controller 190 may move the head carrier 120 at a different velocity than the web velocity such that the head carrier 120 moves the tool heads 130, 140 relative to the webs 102, 104 during the formation of one or more seams. The head carrier 120 and the webs 102, 104 generally only move at the same velocity while a seam is being formed across the webs 102, 104 (e.g., along the y-axis). The controller 190 may selectively move the conveyors 150, 152 at the same velocity as the web velocity such that the conveyors 150, 152 and gap 160 move synchronously with the webs 102, 104. The controller 190 may coordinate the movement of the head carrier 120 and conveyors 150, 152 such that the head carrier 120, conveyors 150, 152, and the gap 160 move synchronously or asynchronously relative to the webs 102, 104 and frame 110 such that the heads 130, 140 have sufficient time to form one or more seams in the webs 102, 104. For example, the controller 190 may cause the head carrier 120, conveyors 150, 152, and the gap 160 to move synchronously with a portion of a webs 102, 104 spanning the gap 160 to allow the tool heads 130, 140 sufficient time to form one or more seams in the web spanning the gap 160. The controller 190 may selectively move one or more of the conveyors 150, 152 at a different velocity and/or direction than the web velocity to control the position of gap 160 to enable seaming of the webs 102, 104 as the webs 102, 104 are advanced by the conveyors 150, 152 through the garment station 100. The controller 190 may coordinate the belt velocity and/or direction of displacement of the conveyors 150, 152 relative to the frame 110 to control the position of the gap 160 relative to the webs 102, 104 as the webs 102, 104 are advanced by the conveyors 150, 152 through the garment station 100.

Figure 1D:
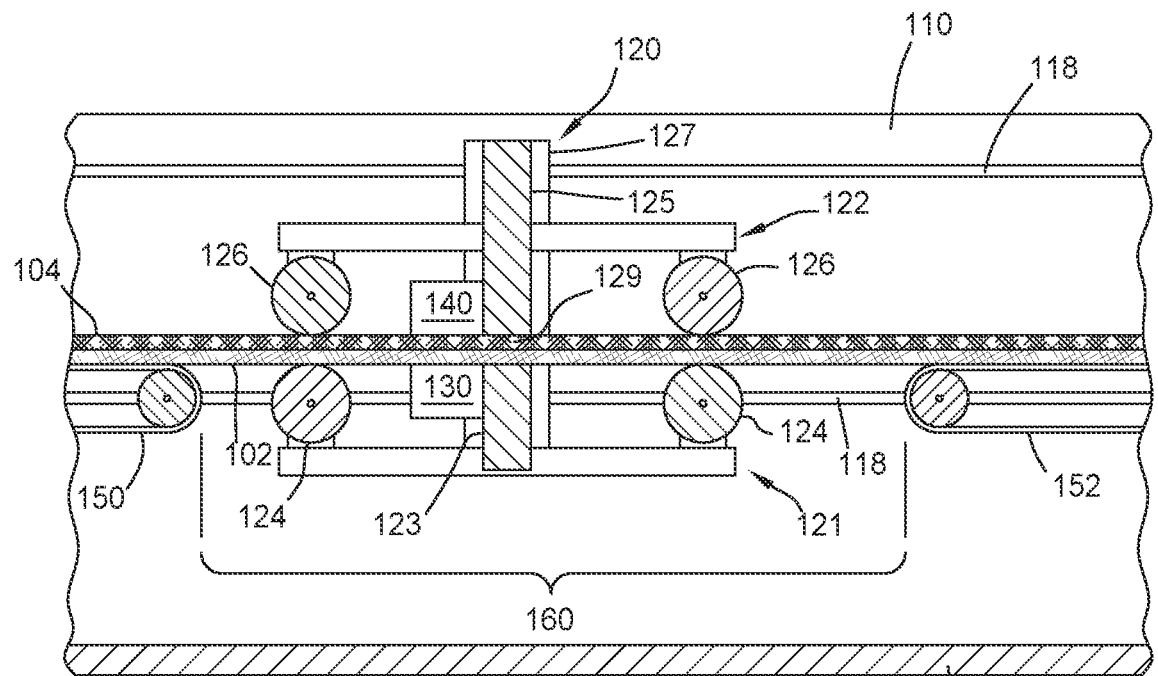
FIG. 1D is a cross-sectional view of the garment station to illustrate a movement of the garment station.
Figure 1E:
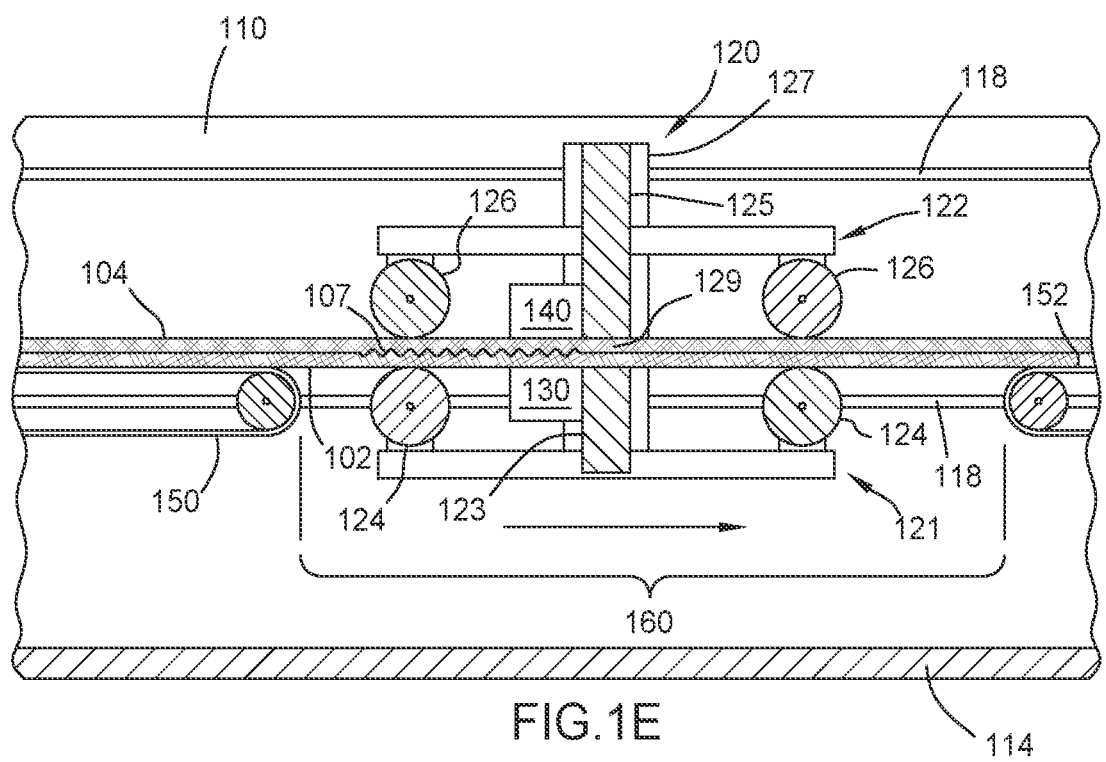
FIG. 1E is a cross-sectional view of the garment station to illustrate a movement of the garment station.

FIG. 1D and FIG. 1E illustrate the coordinated movement of the head carrier 120 and conveyors 150, 152 to form a seam 107 between the first web 102, and the second web 104. The first web 102 and the second web 104 are shown traveling through the garment station 100 in FIG. 1D and FIG. 1E.

FIG. 1D illustrates the head carrier 120 in a first position on the x-axis. The first tool head 130 and the second tool head 140 are at a first position on the y-axis along the head carrier 120. The first web 102 and the second web 104 shown disposed in the slot 129 and are traveling through the garment station 100 at a web velocity. The first conveyor 150 and the second conveyor 152 are shown in a first position along the x-axis. The controller 190 instructs the first tool head 130 and the second tool head 140 to form a seam 107, such as an ultrasonic weld or a stitch, in the webs 102, 104. The controller 190 commands the head carrier 120 to travel along the head carrier track 116 to extend the seam 107 in the direction of the x-axis. The controller 190 may also instruct the first tool head 130 and the second tool head 140 to move synchronously with one another to positions on the y-axis to extend the seam 107 in the direction of the y-axis. The seam 107 may be extended in a direction of the x-axis and the y-axis simultaneously by the moving of the head carrier 120 along the head carrier track 116 and moving the first tool head 130 and the second tool head 140 relative to the head carrier 120.

FIG. 1E illustrates the seam 107 formed by the first tool head 130 and the second tool head 140. As shown in FIG. 1E, the head carrier 120 is in a second position on the x-axis. The first conveyor 150 and the second conveyor 152 are shown in a second position on the x-axis. The first and second tool heads 130, 140 did not move along the y-axis during the formation of the seam 107. As a result, the seam 107 is parallel to the direction of travel of the webs 102, 104. The seam 107 is also parallel to the x-axis. The controller 190 instructs the first tool head 130 and the second tool head 140 to stop forming the seam once the desired seam is formed. The head carrier 120 and the conveyors 150, 152 may be moved to additional positions along the x-axis to form additional seams. The seam 107, which remains attached to the webs 102, 104, may be conveyed from the garment station 100 with the webs 102, 104 for additional downstream processing.

Figure 1F:
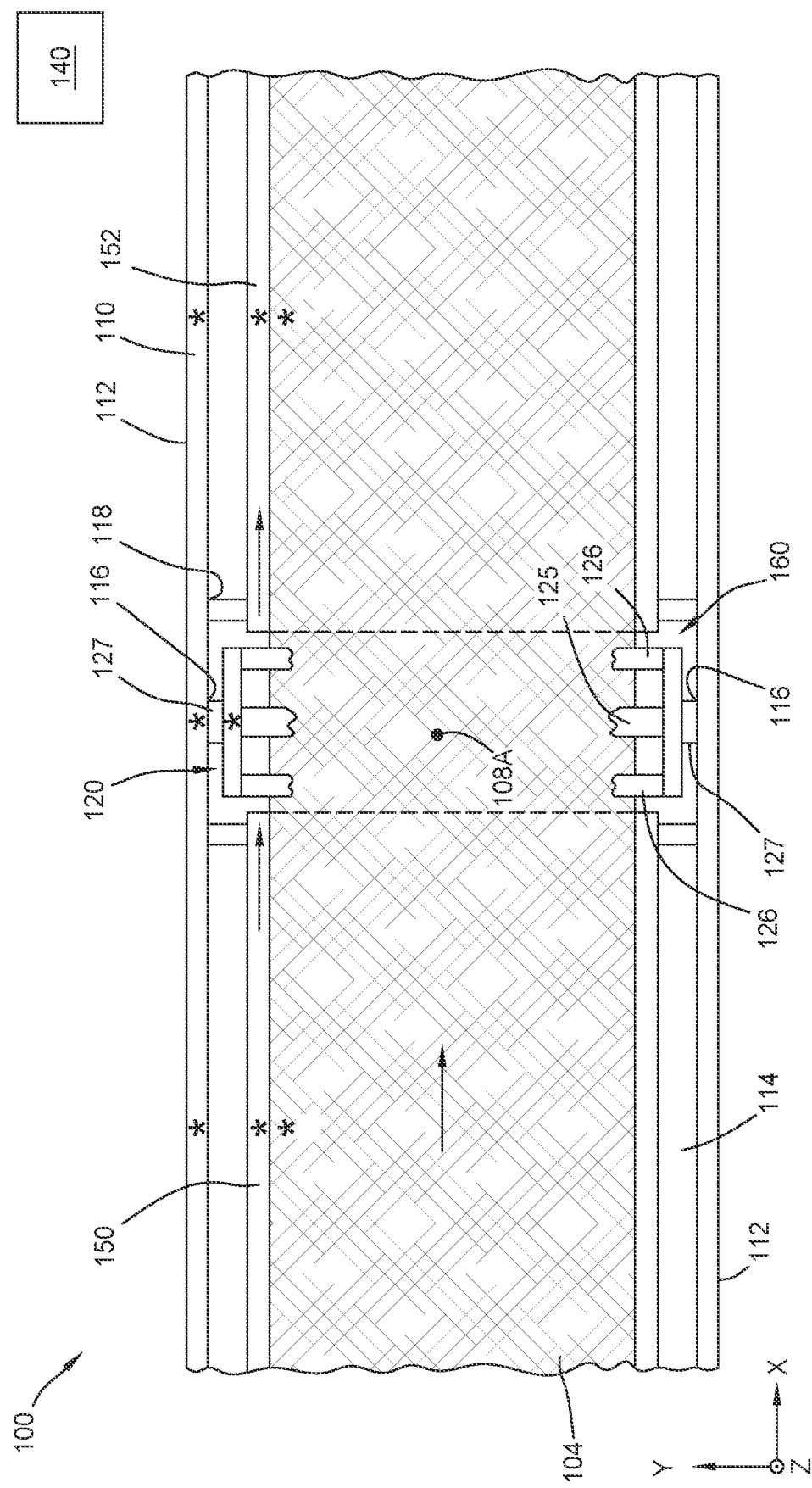
FIG. 1F is a top view of the garment station showing the formation of a seam.
Figure 1G:
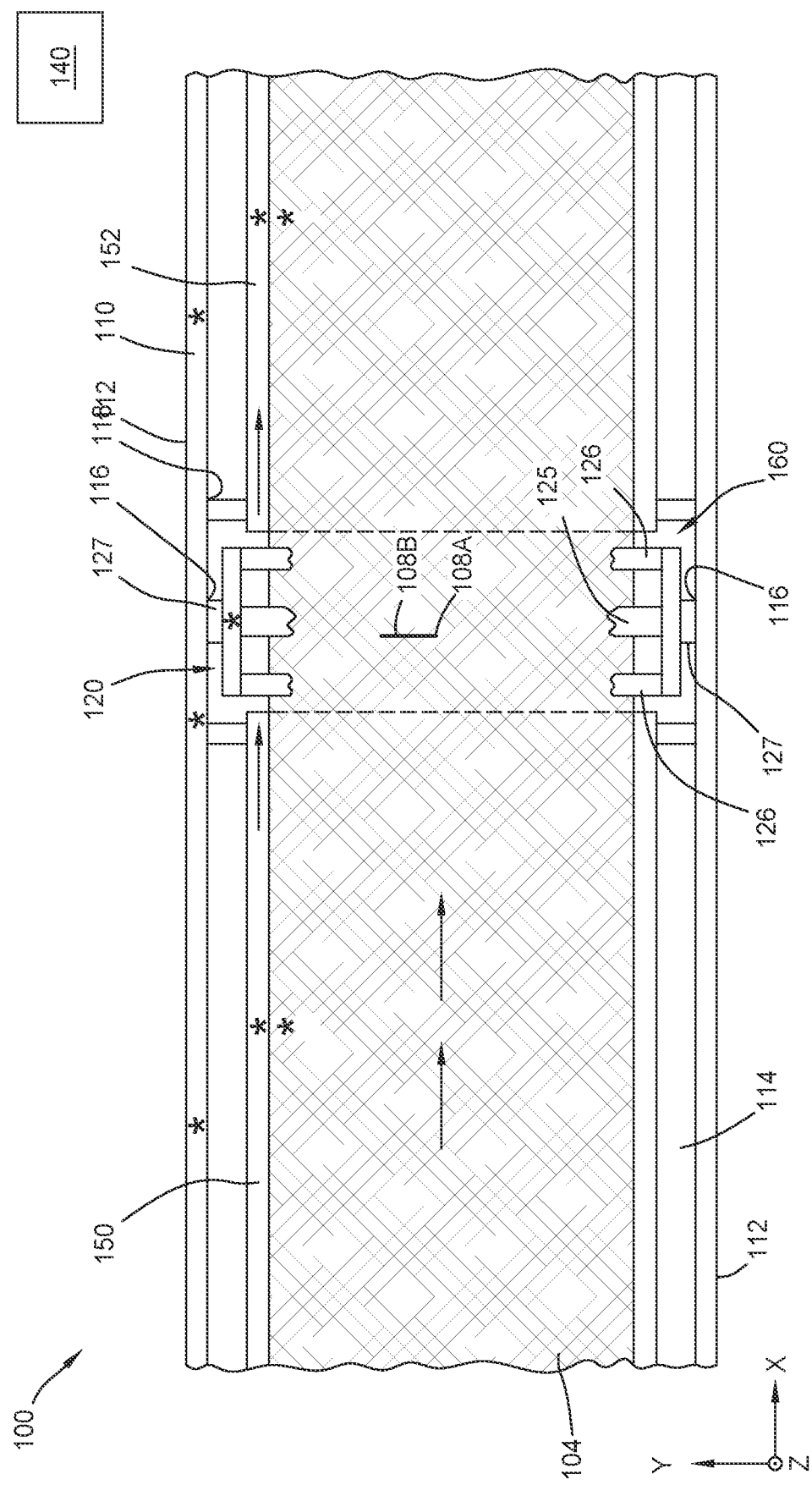
FIG. 1G is a top view of the garment station showing the formation of a seam.
Figure 1H:
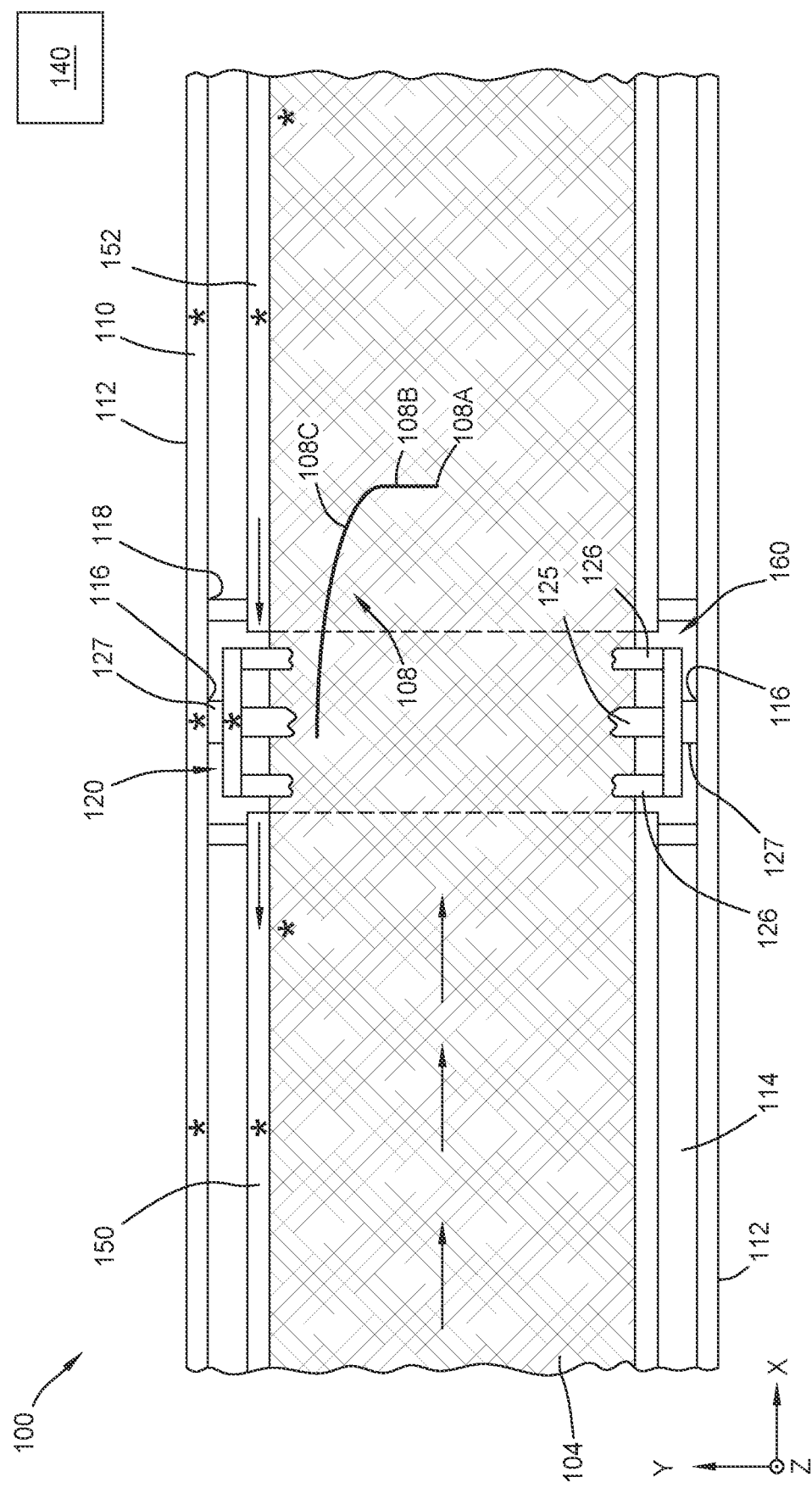
FIG. 1H is a top view of the garment station showing the formation of a seam.

FIGS. 1F-1H illustrate a top view of forming a seam 108 shown fully formed in FIG. 1H, omitting a portion of the head carrier 120 and the second tool head 140 to show the formation of the seam 108. The seam 108 includes a starting point 108A shown in FIG. 1F, a first portion 108B shown in FIG. 1G, and a second portion 108C shown in FIG. 1H. The first web 102 is underneath the second web 104 and is thus obscured from view. Asterisks (*) are shown on the frame 110, the head carrier 120, the conveyors 150, 152, and the web 104 as a point of reference. These asterisks are placed to illustrate the movement of the head carrier 120, the conveyors 150, 152, and the web 104 relative to the frame 110 in FIGS. 1F-1H.

FIG. 1F shows the head carrier 120, conveyors 150, 152, and gap 160 in an initial position to form the seam 108. As shown, the asterisk on the first conveyor 150 is aligned with corresponding asterisks on the web 104 and the frame 110. The asterisk on the second conveyor 150 is aligned with corresponding asterisks on the web 104 and the frame 110. In addition, an asterisk shown on the head carrier 120 aligned with a corresponding asterisk on the frame 110. As shown, the seam 108 begins at point 108A. The controller 190 instructs the tool heads 130, 140 to form the first portion 108B of the seam 108 that is aligned with the y-axis while the webs 102, 104 travel through the garment station 100. The head carrier 120 and conveyors 150, 152 are moved relative to the frame 110 in a first direction to facilitate forming the first portion 108B of the seam 108. The head carrier 120, the conveyors 150, 152, and the gap 160 may be moved synchronously or asynchronously with the webs 102, 104 to form the first portion 108B of the seam 108.

FIG. 1G illustrates the first portion 108B formed in the webs 102, 104. A comparison of the asterisks shows that the head carrier 120, the conveyors 150, 152, and the web 104 have changed position relative to the initial position in FIG. 1F. As shown, the first portion 108B of the seam 108 is linear and was formed as the web 104 was displaced relative to the frame 110 in the first direction. After the first portion 108B of the seam 108 is formed, the second portion 108C of the seam 108 may be formed.

The second portion 108C of the seam 108 is formed by moving the head carrier 120, the conveyors 150, 152, and the gap 160 in a second direction opposite the first direction relative to the frame 110 at a velocity asynchronous with the web velocity. FIG. 1H shows the fully formed seam 108 which includes the formed second portion 108C. The second portion 108C is non-linear and is connected to the first portion 108B. The head carrier 120 and conveyors 150, 152 have returned to the initial position shown in FIG. 1F as illustrated by the alignment of the asterisks. However, the asterisks on the web 104 illustrate that the web 104 continued to travel relative to the frame 110 during the formation of the second seam portion 108C.

In some embodiments, the head carrier 120 and the conveyors 150, 152 move along the same track formed in the frame 110. In one embodiment, the garment station 100 omits the conveyor track 118 and the first conveyor 150 and the second conveyor 152 are fixed in space relative to the frame 110. The gap 160 is not translated with the movement of the head carrier 120. That is, the gap 160 is also fixed in space relative to the frame 110. The head carrier 120 moves within the gap 160 between the first conveyor 150 and the second conveyor 152 to form the one or more seams with the first tool head 130 and the second tool head 140. The rollers 124, 126 may support the webs 102, 104 as the head carrier 120 moves in the gap 160.

Figure 2A:
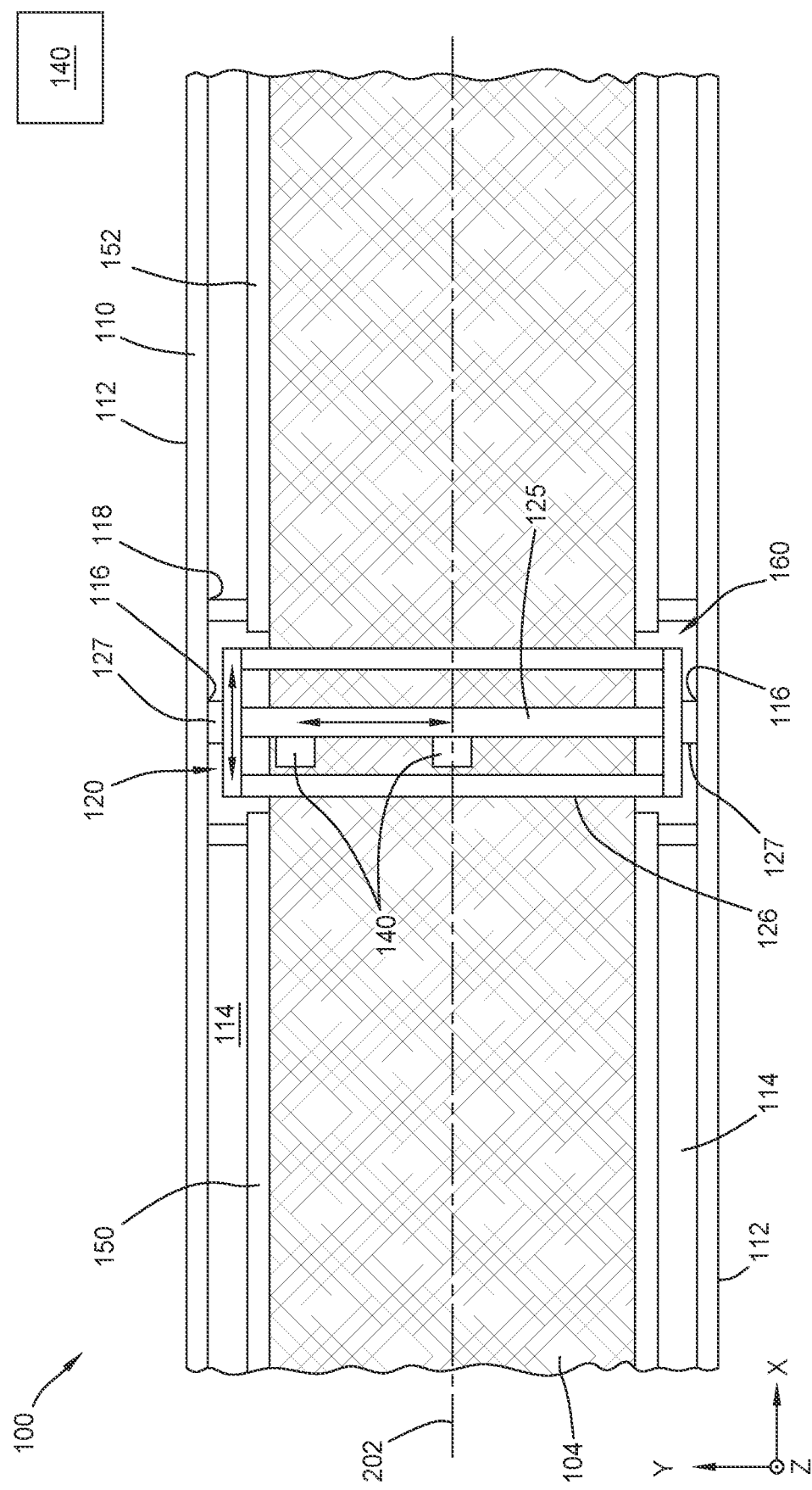
FIG. 2A illustrates a top view of the garment station with a plurality of webs of fabric disposed thereon.
Figure 2B:
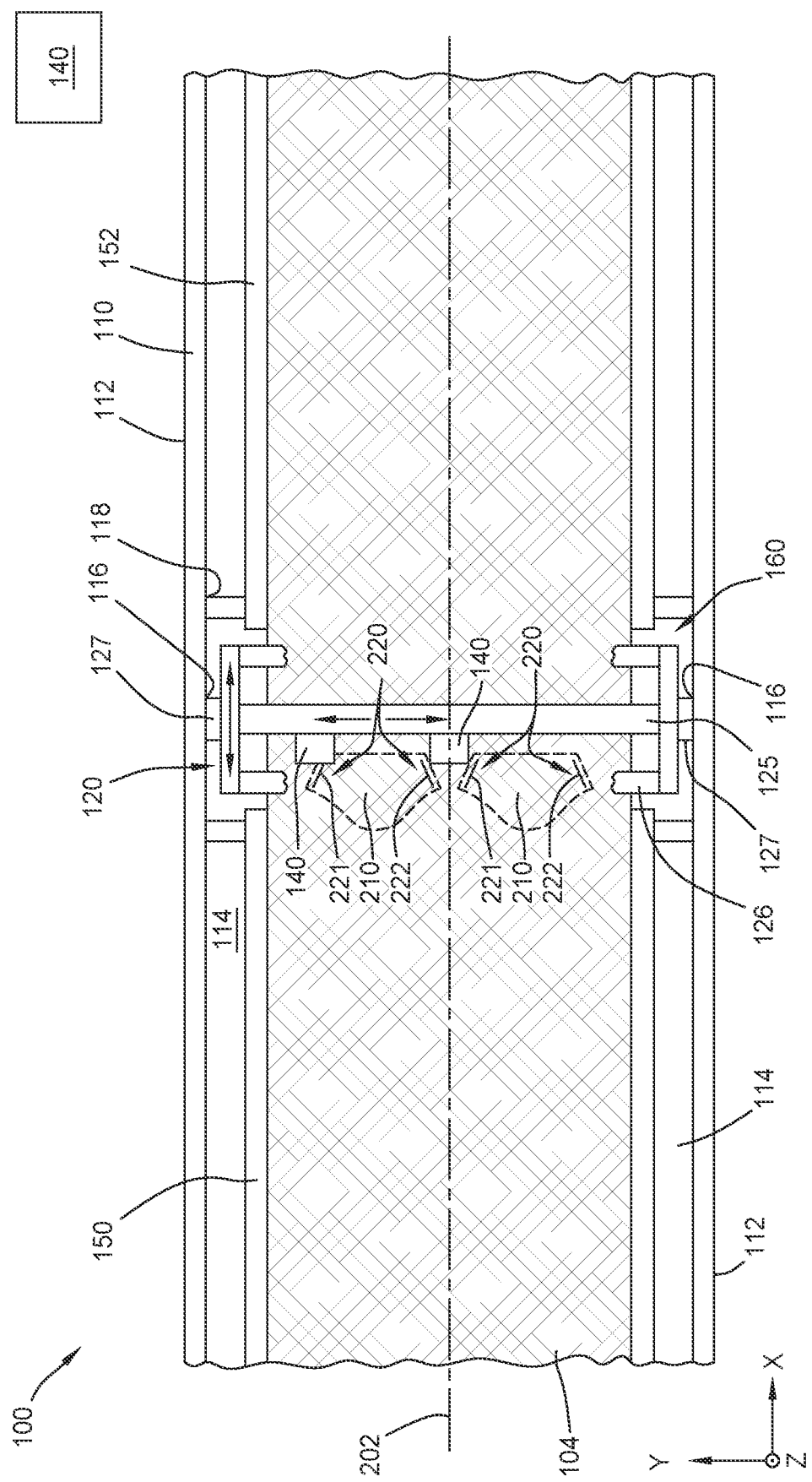
FIG. 2B is a top view of the garment station showing a first seam pattern formed in the plurality of webs.
Figure 2C:
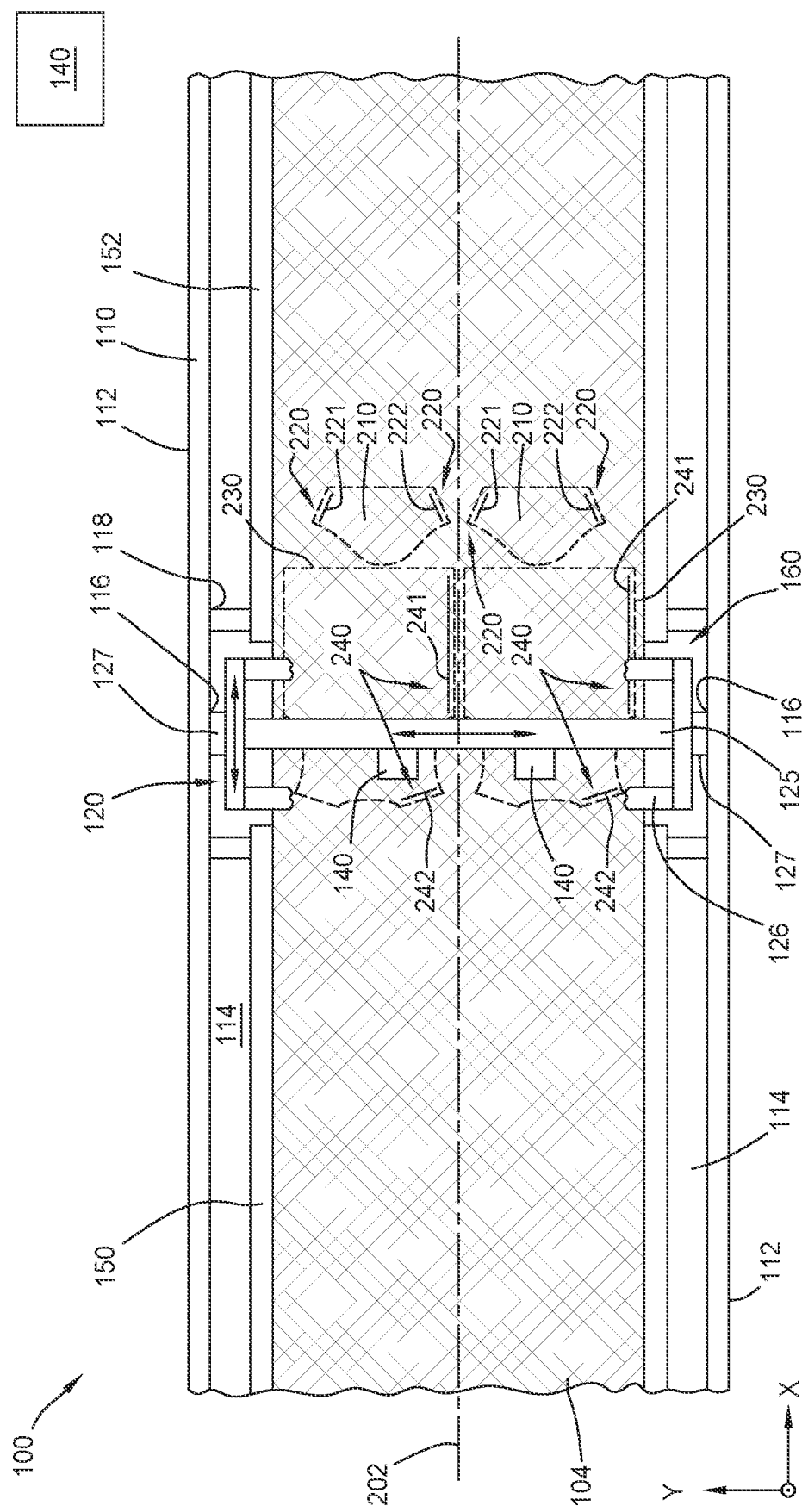
FIG. 2C is a top view of the garment station showing a partially formed second seam pattern in the plurality of webs.

FIGS. 2A-2E illustrate an exemplary process of forming seam patterns of garment components. The garment station 100 may be part of a system to manufacture a first garment component 210 and a second garment component 230. The first and second webs 102, 104 may be overlaid with one another upstream of the garment station 100 and then conveyed into the garment station 100. The outlines of the first garment component 210 and the second garment component 230 are shown in dashed lines as shown in FIGS. 2B and 2C. The garment station 100 is used to form a first seam pattern 220 of the first garment component 210 and a second seam pattern 240 of the second garment component 230 as shown in FIG. 2C. The first seam pattern 220 may be seam lines of the first garment component 210 and the second seam pattern 240 may be seam lines of the second garment component 230. The controller 190 instructs the garment station 100 to form the first seam pattern 220 and the second seam pattern 240 to join the webs 102, 104 together using the first tool heads 130 and the second tool heads 140. The controller 190 may instruct the garment station 100 to form the first and second seam patterns 220, 240 while the webs 102, 104 travel at a web velocity. The controller 190 may maintain or adjust the web velocity by adjusting the position of the conveyors 150, 152 while the first and second seam patterns 220, 240 are formed. For example, the controller 190 may cause the throughput of the webs 102, 104 to stop while the head carrier 120, first tool head 130, and second tool head 140 are positioned to form the first seam pattern 220 and the second seam pattern 240. After the first seam pattern 220 and the second seam pattern 240 are formed, the webs 102, 104, including the seam patterns 220, 240 formed therein, may be conveyed to a downstream process. The downstream process may be conveyed into an excise station which excises the garment components 210, 230 from the webs 102, 104.

FIGS. 2A-2E are top views of the garment station 100 with the first web 102 and the second web 104 disposed therein. The garment station 100 is shown including two second tool heads 140. Each second tool head 140 includes a corresponding first tool head 130, but the first tool heads 130 are obscured by the webs 102, 104. Each first tool head 130 moves synchronously with its corresponding second tool head 140. Using two sets of tool heads 130, 140 allows for two seam patterns, such as the first seam pattern 220 and second seam pattern 240, to be formed on different portions of the webs 102, 104 to increase the production of garment components, or to produce a seam comprising two offset seams. The centerline 202 is shown extending in the direction the x-axis down the center of the conveyors 150, 152.

FIG. 2A shows the webs 102, 104 initially fed into the garment station 100. The head carrier 120, first tool heads 130, and second tool heads 140 may be moved into a position in preparation of forming the first seam pattern 220. Once in position, the controller 190 instructs each set of tool heads 130, 140 to form the first seam pattern 220. The controller 190 coordinates the movement of the head carrier 120, each set of tool heads 130, 140, and the conveyors 150, 152 to form the first seam patterns 220.

FIG. 2B illustrates the garment station 100 after forming a first seam pattern 220 on either side of the centerline 202 of the webs 102, 104. The first garment component 210 is shown as dashed lines, and the first garment component 210 may be a sleeve of a t-shirt or other portion of a garment. A portion of the rollers 126 are omitted to better show the first seam pattern 220.

The first seam pattern 220 may include a first seam 221 and a second seam 222. The first seam 221 may be formed before or after the second seam 222. For example, the controller 190 may instruct the garment station 100 to move each first tool head 130 and its aligned second tool head 140 into position to form the first seam 221. The controller 190 may instruct the first tool head 130 and/or the second tool head 140 to change an orientation relative to the x/y axes prior to forming the first seam 221. The orientation of the first tool head 130 and/or the second tool head 140 may be maintained while the first seam 241 is formed. For example, the first tool head 130 and/or the second tool head 140 may be orientated to form the first seam 221 at an angle relative to the centerline 202. The controller 190 then instructs the first tool head 130 and the second tool head 140 to form the first seam 221, such as by ultrasonically welding or stitching the webs 102, 104 together. The controller 190 coordinates the movement of the conveyors 150, 152, the head carrier 120, the first tool heads 130, and the second tool heads 140 to create the first seam 221 on both sides of the centerline 202 simultaneously.

After the first seam 221 is formed, the controller 190 instructs the first and second tool heads 130, 140 to stop securing the webs 102, 104 together. The controller 190 may then reposition each set of tool heads 130, 140 to form the second seam 222. The orientation of the first tool heads 130 and the second tool heads 140 may be changed to form the second seam 222, such as forming the second seam 222 at a different angle relative to the centerline 202 than the first seam 221. The second seam 222 may be made in the same manner as described with respect to the first seam 221.

Figure 2D:
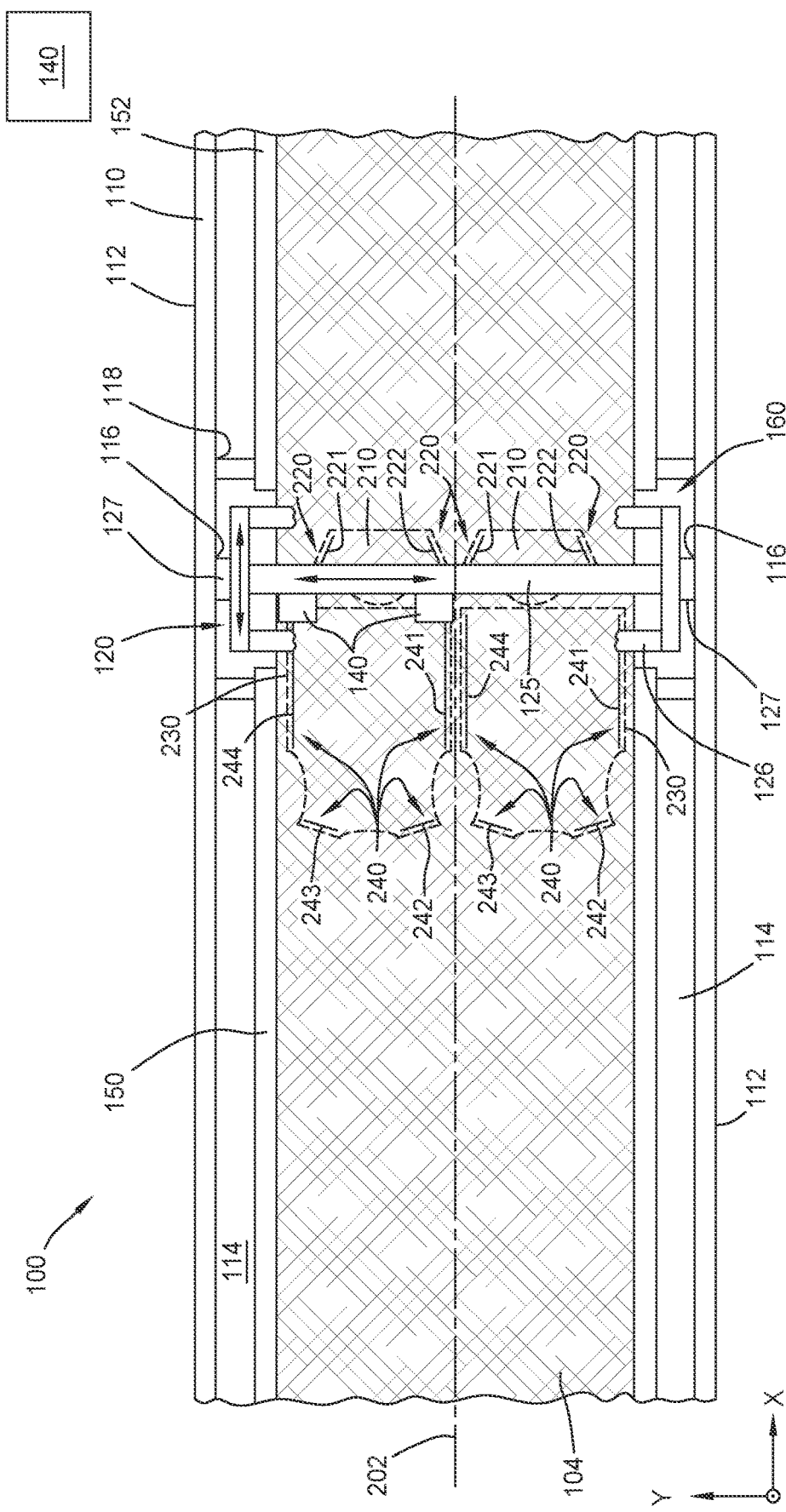
FIG. 2D is a top view of the garment station showing the completed second seam pattern formed in the plurality of webs.

FIGS. 2C and 2D illustrate forming the second seam pattern 240 on each side of the centerline 202 of the webs 102, 104. A portion of the rollers 126 are omitted to better show the first seam pattern 220 and the second seam pattern 240. The second seam pattern 240 may be formed into the webs 102, 104 after the first seam pattern 220. To form the second seam pattern 240, the first and second tool heads 130, 140 are moved upstream (i.e., the direction opposite the general direction of fabric travel through the garment station 100) of the first seam pattern 220 and into position to form the second seam pattern 240. The head carrier 120 and tool heads 130, 140 may be moved in response to an instruction from the controller 190. Once in position to form the second seam pattern 240, the controller 190 instructs each set of tool heads 130, 140 to form the corresponding second seam pattern 240. The controller 190 coordinates the movement of the head carrier 120, each set of tool heads 130, 140, and the conveyors 150, 152 to form the second seam patterns 240.

The second seam pattern 240 may include a first seam 241, a second seam 242, a third seam 243, and a fourth seam 244. The seams 241-244 may be formed in any order.

FIG. 2C illustrates the first seam 241 and the second seam 242 formed in the webs 102, 104. For example, the controller 190 instructs the garment station 100 to move each first tool head 130 and each second tool head 140 into position to form the first seam 241 of the second seam pattern 240. The controller 190 also instructs the first tool head 130 and/or the second tool head 140 to change an orientation prior to starting to form the first seam 241. The orientation of the first tool head 130 and/or the second tool head 140 may be maintained while the first seam 241 is formed. The controller 190 then instructs the first tool head 130 and the second tool head to form the first seam 241, such as by ultrasonically welding or stitching the webs 102, 104 together. The controller 190 coordinates the movement of the conveyors 150, 152, the head carrier 120, and the first tool heads 130, and the second tool heads 140 to create the first seam 241 on both sides of the centerline 202 simultaneously.

As shown in FIG. 2C, the first seam 241 is parallel to the centerline 202 and the x-axis. The tool heads 130, 140 maintain a position on the y-axis to form the first seam 241. The tool heads 130, 140 may be oriented to form the first seam 241 parallel to the centerline 202 and the x-axis. The head carrier 120 may maintain a position on the x-axis while the tool heads 130, 140 form the first seam 241 as the webs 102, 104 travel in the direction of the x-axis at a web velocity. The head carrier 120 may also move relative to the webs 102, 104 to move the tool heads 130, 140 to form the first seam 241.

After the first seam 241 is formed, the controller 190 may instruct the first and second tool heads 130, 140 to stop securing the webs 102, 104 together. The controller 190 may then position each set of tool heads 130, 140 to form the second seam 222. The controller 190 may instruct the first tool head 130 and/or the second tool head 140 to change an orientation prior to forming the second seam 242. For example, the first tool head 130 and/or the second tool head 140 may be orientated to form the second seam 242 at an angle relative to the centerline 202. The orientation of the first tool head 130 and/or the second tool head 140 may be maintained while the second seam 242 is formed. The controller 190 then instructs the first tool head 130 and the second tool head to form the second seam 242, such as by ultrasonically welding or stitching the webs 102, 104 together. The controller 190 coordinates the movement of the conveyors 150, 152, the head carrier 120, the first tool heads 130, and the second tool heads 140 to create the second seam 242 on both sides of the centerline 202 simultaneously. Each set of tool heads 130, 140 may be moved between positions on the x, y axes to form the respective second seam 242, such as by the movement of the head carrier 120 along the head carrier tracks 116 and the first and second heads 130, 140 relative to the head carrier 120.

After the second seam 242 is formed, the controller 190 may instruct the first and second tool heads 130, 140 to stop securing the webs 102, 104 together. The controller 190 may then position each set of tool heads 130, 140 to form the third seam 243 on both sides of the centerline 202. The third seam may be formed in a similar manner as described above with respect to the second seam 242. After the third seam 243 is formed, the controller 190 may instruct the first and second tool heads 130, 140 to stop securing the webs 102, 104 together. The controller 190 may then position each set of tool heads 130, 140 to form the fourth seam 244 on both sides of the centerline 202. The fourth seam 244 may be formed in a similar manner as described above with respect to the first seam 241.

Figure 2E:
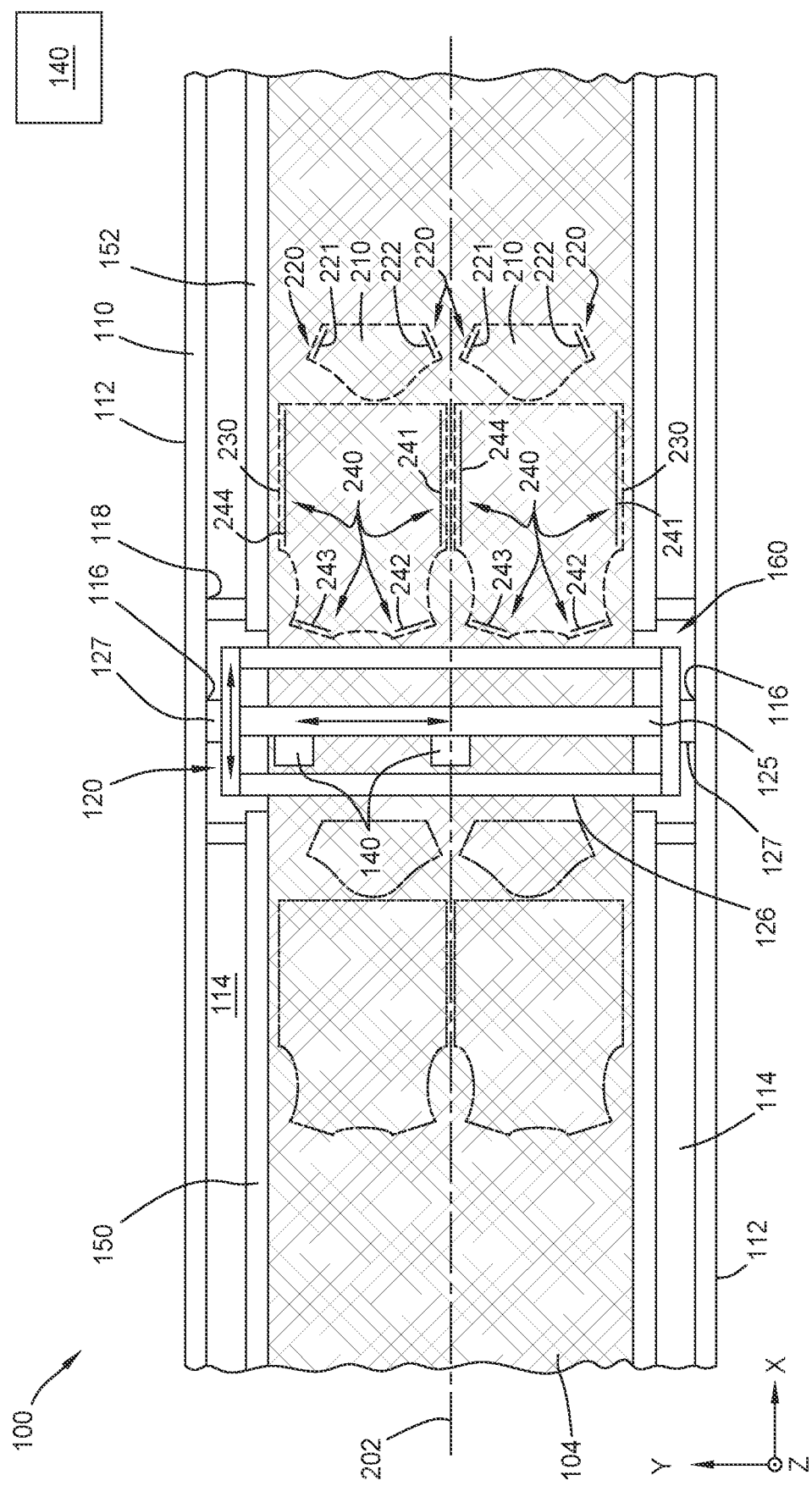
FIG. 2E is a top view of the garment station in position to form additional seam patterns into the plurality of webs.

FIG. 2D illustrates the third seam 243 and the fourth seam 244 to show the completed second seam pattern 240. The second garment component 230, shown in dashed lines, may be excised in a downstream process. After the second seam pattern 240 is formed, the first and second tool heads 130, 140 are moved upstream of the second seam pattern 240 and into position to form one or more additional seam patterns as shown in FIG. 2E. The additional one or more additional seam patterns may be additional first seam patterns 220 and second seam patterns 240. The additional one or more additional seam patterns may be a different seam pattern, such as a seam pattern with different scaling to form a larger or smaller garment component (such as a small t-shirt as opposed to an XL t-shirt), or an entirely different type of garment component (such as pant legs). FIG. 2E shows the outline of additional garment components 210, 230 in dashed lines upstream of the head carrier 120 that will have a seam pattern made by the garment station 100.

The first garment component 210 may be a sleeve as shown in FIG. 2E. The seams 221, 222 of the first seam pattern 220 are seams in the sleeve 210. When the sleeve 210 component is excised from the webs 102, 104, the sleeve 210 will have seams 221, 222 and a sleeve hole for the insertion of the arm. The second garment component 230 may be a t-shirt body as shown in FIG. 2E. The seams 241-244 are seams of the t-shirt body. The seams 241-244 may be positioned to leave a neck, sleeve, and torso hole in the second garment component 230. The sleeve 210 may be attached to the sleeve hole of the t-shirt body 230 to form a t-shirt.

Figure 3:
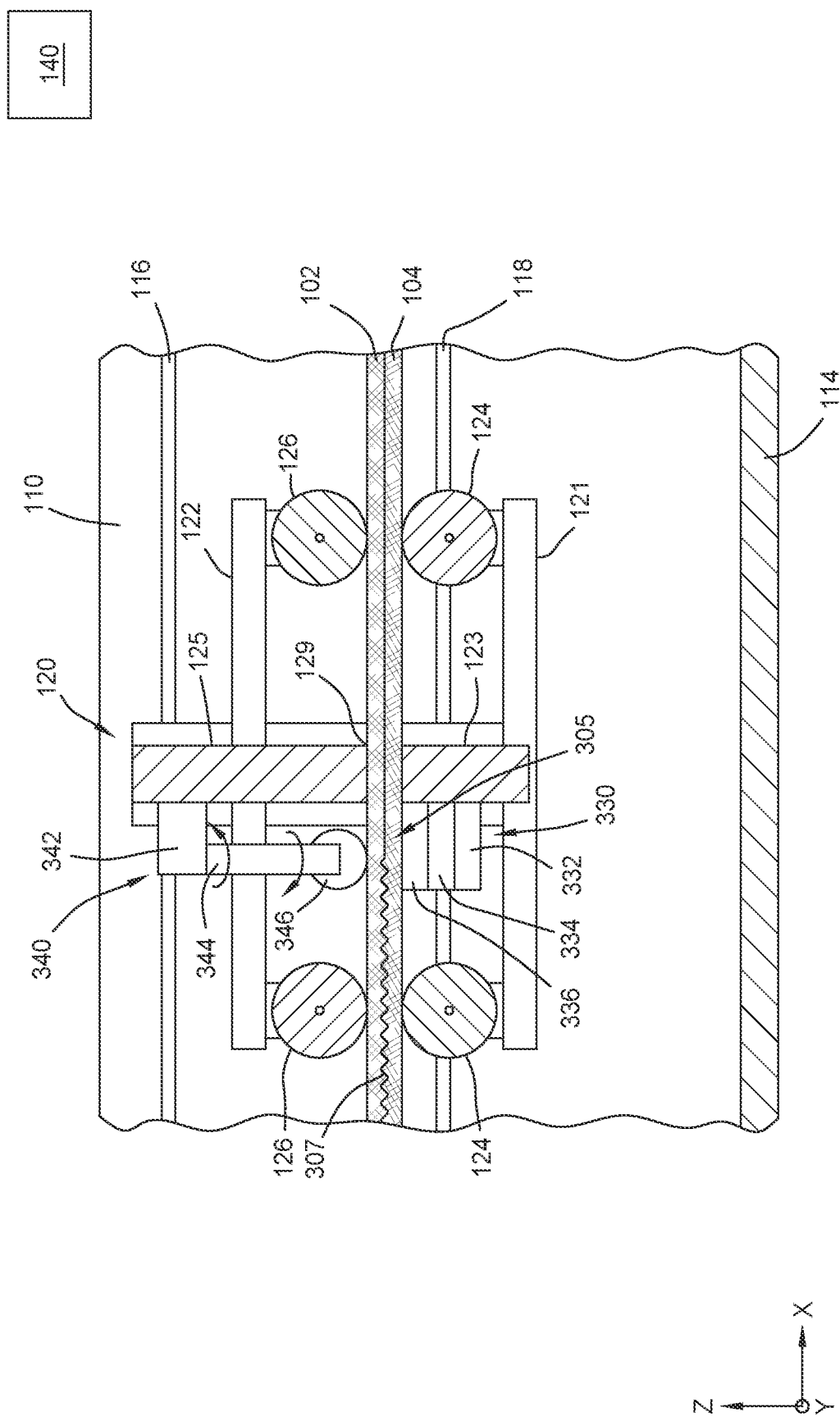
FIG. 3 illustrates the garment station with an alternative embodiment of a first tool head and a second tool head to form seam patterns by ultrasonically welding the plurality of webs together.

FIG. 3 illustrates a partial cross-sectional view of one embodiment of the garment station 100 that forms the seams by ultrasonic welding webs of fabric together, such as forming an ultrasonic weld between webs of a polyester or a non-woven fabric. The garment station 100 is shown with a first tool head 330 substituted for first tool head 130 and a second tool head 340 substituted for second tool head 140. The first tool head 330 and the second tool head 340 may be moved as discussed above with respect to FIGS. 2A-2E to form one or more seam patterns in webs of fabric.

The first tool head 330 is a horn assembly and the second tool head 340 is an anvil assembly. The first tool head 330 and the second tool head 340 cooperate to ultrasonically weld the first web 102 to the second web 104 to form one or more seams, such as the seam 307 as shown in FIG. 3.

The first tool head 330 may include, as shown in FIG. 3, a transducer 332, a booster 334, and a horn 336. The transducer 332 (e.g., piezoelectric converter) converts an electrical signal from an electrical source (not shown) into mechanical vibrations that are amplified by the booster 334. The electrical source may be, for example, an electrical generator of the garment station 100, such an electrical generator disposed on the head carrier 120. The horn 336 (e.g., a sonotrode, horn) is connected to the transducer 332. The horn 336 is configured to be placed in contact with the first web 102 to transfer mechanical vibrations (e.g., ultrasonic waves) from the transducer 332 to the first web 102 and the second web 104. The horn 336 contacts the first web 102 at a horn-web interface 338.

The second tool head 340 may include, as shown in FIG. 3, an actuator assembly 342, a shaft 344, and an anvil 346. The anvil 346 may be a roller that is engaged with the shaft 344. The anvil 346 contacts the second web 104 directly below the horn 336, such that the first and second webs 102, 104 are sandwiched under pressure between the anvil 346 and the horn 336. The actuator assembly 342 may include a rotary actuator (not shown) to rotate the shaft 344 and anvil 346, and a linear actuator (not shown) to translate the shaft 344 and anvil 346 in the direction of the z-axis of the garment station 100. FIG. 1B illustrates the anvil 346 in engagement with the second web 104. The controller 190 actuates the actuator assembly 342 to press the anvil 346 into engagement with the second web 104 to selectively apply a force to the first web 102 and the second web 104 disposed between the anvil 346 and the horn-web interface 338 during the welding process. The horn-web interface 338 may be coplanar with a bottom surface of the slot 129. In some embodiments, a clearance may be present between the horn-web interface 338 and the first web 102 prior to the actuator assembly 342 pressing the anvil 346 against the second web 104 such that when not forming a seam, the webs 102, 104 may be freely advanced through the space defined between the anvil 346 and the horn 336. The actuator assembly 342 may be actuated to rotate the anvil 346 about the longitudinal-axis of the shaft 344 to one or more orientations. For example, the anvil 346 may be oriented at an angle relative to the x-axis or the centerline 202 of the webs 102, 104, such as an angle of 45 degrees relative to the centerline 202. As shown in FIG. 1B, the anvil 346 is oriented parallel to the x-axis. In some embodiments, the actuator 324 is not configured to rotate the anvil 346 about the longitudinal-axis of the shaft 344, and the shaft 344 may freely rotate relative to the actuation assembly 324.

The first tool head 330 and the second tool head 340 travel with the head carrier 120 to positions on the x-axis between the facing edges of the conveyors 150, 152. The first tool head 330 and the second tool head 340 are moveable synchronously to positions on the y-axis by moving along the respective first track section 123 and second track section 125. The anvil 346 and the horn 336 travel synchronously between positions on the x/y axes by the travel of the head carrier 120 relative to the frame 110 such that the first and second tool heads 330, 340 remain aligned in the moving and/or stationary gap 160 to form one or more seams 307.

During an ultrasonic welding process, ultrasonic vibrations are applied to the first web 102 and the second web 104 by the horn 336, and the anvil 346 presses the first web 102 and second web 104 together at a faying interface 305 (e.g., seam). Heat from ultrasonic vibration (e.g., heat from friction between the webs 102, 104, and intermolecular vibration) melts the material of the first web 102 and of the second web 104 at the faying interface 305. Ultrasonic vibration causes local melting of webs 102, 104 due to absorption of vibrational energy. Once the ultrasonic vibration is stopped, the local melt begins to solidify. Once solidified, the webs 102, 104 are welded together at the faying interface 305.

The anvil 346 may be rotated to an orientation before or during a welding process to form a desired welded seam between the first web 102 and second web 104. The anvil 346 may be rotated between orientations by the actuator assembly 342 to form a desired welded seam 307 between the webs 102, 104 as the anvil 346 is translated along the x/y axes. In some embodiments, the anvil 346 is maintained at an orientation forming an ultrasonic weld 307 between webs of fabric. In some embodiments, the anvil 346 is rotated to an orientation prior to engaging the second web 104.

In some embodiments, the anvil 346 may be disengaged from the second web 104 after a welded seam 307 is completed. In some embodiments, the controller 190 instructs the transducer 332 to stop producing ultrasonic vibration after the welded seam 307 is completed. In some embodiments, the anvil 346 is disengaged from second web 104 after a welded seam 307 is made and reengaged with the second web 104 to form an additional welded seam.

Figure 4:
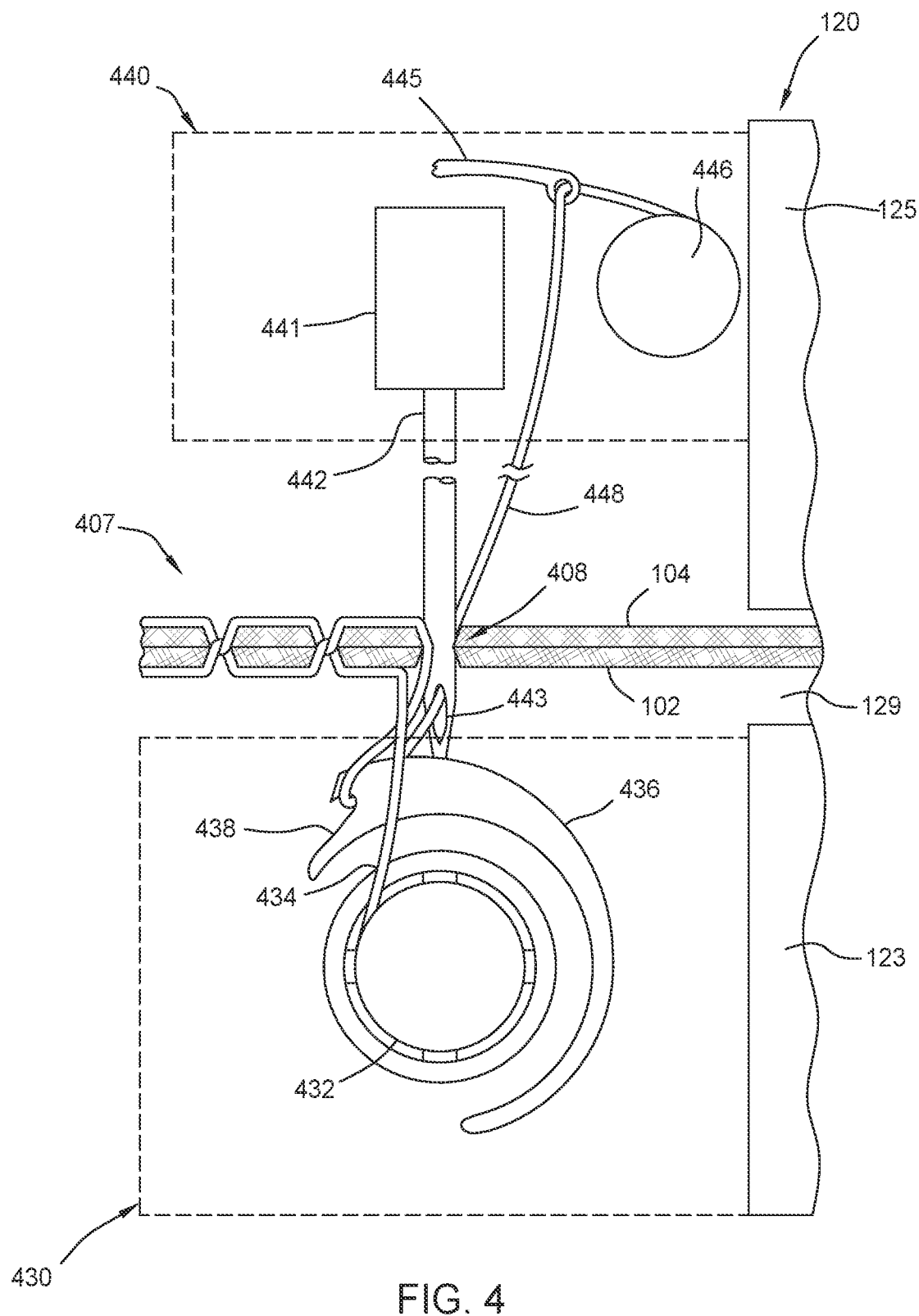
FIG. 4 illustrates the garment station with an alternative embodiment of the first tool head and the second tool head to form seam patterns by stitching the plurality of webs together.

FIG. 4 illustrates one embodiment of the garment station 100 that forms the seams by stitching. The garment station 100 is shown with a first tool head 430 substituted for first tool head 130 and a second tool head 440 substituted for second tool head 140. The first tool head 430 and the second tool head 440 may be moved as discussed above with respect to FIGS. 2A-2E to form one or more seam patterns in webs 102, 104 of fabric. The first tool head 430 and the second tool head 440 are a sewing assembly. The first tool head 430 and the second tool head 440 cooperate to form a seam 407 (e.g., stitch) in the webs 102, 104, such as a lock stitch, or other suitable stitch.

The first tool head 430 is moveable along the first track section 123 synchronously with the second tool head 440. The first tool head 430 includes a bobbin 432 and a shuttle 436. The bobbin 432 is disposed in the shuttle 436. A first thread 434 is coiled around the bobbin 432. The first thread 434 is fed from the bobbin 432 as the stitch 407 is made. The shuttle 436 includes a hook 438. The shuttle 436 is rotated by a shuttle actuator (not shown).

The second tool head 440 is moveable along the second track section 125. The second tool head 440 includes a needle actuator 441, a needle 442, a take-up lever 445, and a spool 446. The needle 442 includes an eye 443. The spool 446 includes a second thread 448, and the second thread 448 is fed from the spool 446 as the stitch 407 is made. The second thread 448 is fed through the eye 443 and the take-up lever 445. The needle actuator 441 reciprocates the needle 442 to repeatedly puncture the webs 102, 104. The second thread 448 is engaged by the hook 438 of the shuttle 436 after the second thread 448 is pushed through a puncture 408 in the webs 102, 104 by the reciprocating action of the needle 442. The take-up lever 445 is reciprocated to create and releases tension in the second thread 448 to facilitate making the stitch 407.

The rotation of the shuttle 436, the reciprocation of the needle 442, and reciprocation of the take-up lever 445 are coordinated to make the stitch 407. After the second thread 448 is engaged by the hook 438, the second thread 448 engaged with the hook 438 is looped around the first thread 434 as the shuttle 436 is rotated. After a partial or full revolution of the shuttle 436, the second thread 448 is released from the hook 438. The take-up lever 445 is moved to apply a tension to the second thread 448 as the second thread 448 is looped around the first thread 434 by the rotation of the shuttle 436. The take-up lever 445 is moved upwards to apply a tension to the second thread 448 once released from the hook 438 to tighten the second thread 448 against the webs 102, 104 to form the stitch 407. The take-up lever 445 may be in a downstroke position when the needle 442 punctures through the webs 102, 104 such that the take-up lever 445 does not apply tension to the second thread 448 to facilitate the engagement of the second thread 448 with the hook 438.

In some embodiments, the second tool head 440 may include a looping hook (not shown) instead of a shuttle 436 to form a chain stitch or other type of stitch with the first tool head 430. In some embodiments, the first and second tool heads 430, 440 may form a stitch in the web that is a stitch other than a lock stitch or a chain stitch.

The first tool head 430 and/or the second tool head 440 may be rotated to an orientation to facilitate forming the stitch 407. The first tool head 430 and/or the second tool head 440 may maintain the orientation while forming the stitch, or the first tool head 430 and/or the second tool head 440 may change orientations as the stitch 407 is made. In some embodiments, the first tool head 430 and the second tool head 440 do not change an orientation to make a stitch 407 even if the stitch 407 is made at an angle relative to the direction of travel of the webs 102, 104, such as at an angle relative to the x-axis.

The first tool head 430 and the second tool head 440 may each include a cutting mechanism, such as a blade, to sever the respective first thread 434 and second thread 448 once the stitch 407 is completed.

Figure 5:
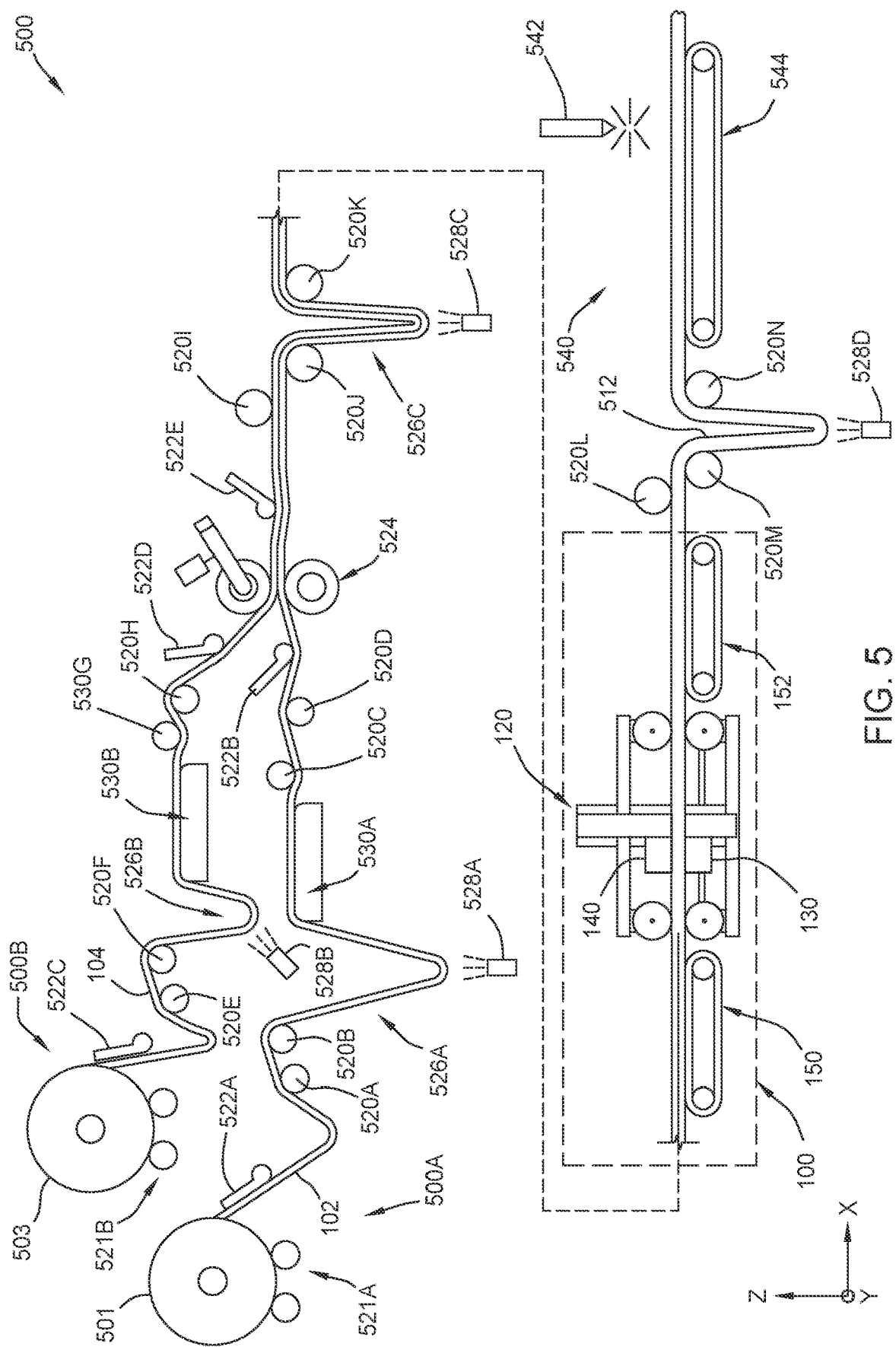
FIG. 5 is a schematic side view of an exemplary automated garment manufacturing system.

FIG. 5 is a schematic side view of an exemplary automated garment manufacturing system 500. The system 500 manufactures garments from webs 102, 104. In some embodiments, the manufactured garment may be a garment component that requires the addition of other garment components to form a finished garment. The system 500 includes a first fabric roll 501, a second fabric roll 502, a plurality of rollers (e.g., 520A-N), a first roller system 521A, a second roller system 521B, a plurality of dancers (e.g., 522A-E), a plurality of fabric preparation systems 526 (e.g., 526A-D), a plurality of relaxer stations 530 (e.g., 530A-B), the garment station 100, and an excise station 540. The first fabric roll 501 dispenses the first web 102 and the second fabric roll 502 dispenses the second web 104. The controller 190 may control the system 500.

The system 500 may comprise a first fabric transport system 500A, a second fabric transport system 500B. The first fabric transport system 500A moves the first web 102 from the first fabric roll 501 and feeds the first web 102 through the system 500. The second fabric transport system 500B moves the second web 104 from the second roll 502 and feeds the second web 104 through the system 500. In some embodiments, and as shown in FIG. 5, the first fabric transport system 500A includes rollers 520 (e.g., rollers 520A-D), the first roller system 521A, a first dancer 522A, a second dancer 522B, a first fabric preparation system 526A, and a first relaxer station 530A. In some embodiments, and as shown in FIG. 5, the second fabric transport system 500B includes rollers 520 (e.g., rollers 520E-H), the second roller system 521B, a third dancer 522C, a fourth dancer 522D, a second fabric preparation system 526B, and a second relaxer station 530B.

The first web 102 and second web 104 are conveyed to the pinch rollers 524. The pinch rollers 524 (also referred to as nip rollers) apply a force to the first web 102 and the second web 104 to press the webs 102, 104 together to form layered webs of fabric 510. The layered webs of fabric 510 is conveyed to the garment station 100, which forms one or more seam patterns into the layered web of fabric 510 to produce a secured (i.e., joined) webs of fabric 512. The joined webs of fabric 512 is conveyed from the garment station 100 to the excise station 540 to produce one or more garment components.

The first fabric roll 501 and the second fabric roll 502 may rotate about its axis and dispense the respective webs 102, 104 along the x-axis of the system 500. The first and second roller systems 521A-B may include two rollers, and each roller system 521A-B feeds the respective web 102, 104 through the system 500. At least one of the two rollers of each roller system 521A-B may be motorized such that the motorized roller contacts the respective fabric roll 501, 502 and selectively rotates the fabric roll 501, 502 at a selected speed, pulling or pushing the webs 102, 104 along the x-axis. In some embodiments, each roller system 521A-B may be omitted, and each fabric roll 501, 502 may be coupled to one or more actuators, gears, motors (continuous or step) that rotate at a selected speed pulling or pushing the webs 102, 104 along the x-axis. In some embodiments, each fabric roll 501, 502 is free to move but is not mounted on motorized shafts.

Each relaxer station 530A-B relaxes a respective web 102, 104. The first relaxer station 530A relaxes the first web 102 as the first web 102 is removed from the first roll 501 and before the first web 102 is processed by the garment station 100. The second relaxer station 530B relaxes the second web 104 as the second web 104 is removed from the second roll 502 and before the second web 104 is processed by the garment station 100. Each relaxer station 530A-B may be an air table that forces air through perforations in a surface of the air table. The surface of the air table may face the respective web 102, 104 such that the air is forced against the respective web 102, 104 to relaxes the respective web 102, 104, beneficially reducing or eliminating wrinkles before processing the webs 102, 104 with the garment station 100 and excise station 540. In some embodiments, each relaxer station 530A-B may heat or cool the web, such as by blowing hot or cold air.

The system 500 further includes the plurality of rollers 520 (e.g., rollers 520A-E) to facilitate the movement of the webs 102, 104, 510, 512. The rollers 520 may include any combination of fixed rollers, such as idler rollers, or motorized rollers, such as drive rollers or driven guide rollers. For example, actuators or motors may be located on at least a subset of the rollers 520, providing pull or push forces acting on the webs 102, 104, 510, 512. The rollers 520 may also include anti-wrinkle rollers or augers to spread the webs 102, 104, 510, 512 of fabric transversely to stretch wrinkles out of the fabric. In some embodiments, the anti-wrinkle rollers or augers may include a roller or a set of rollers on each side of the respective webs 102, 104, 510, 512. The rollers 520 of each side may contact the respective web 102, 104, 510, 512 at angle that is not perpendicular to the respective webs such that each roller 520 pulls the respective web 102, 104, 510, 512 towards the sides of the web 102, 104, 510, 512 to release wrinkles. In some embodiments, the anti-wrinkle rollers or augers may include a roller that is perpendicular to the respective web 102, 104, 510, 512 that spreads the web as the web passes over the anti-wrinkle roller or auger.

In the depicted embodiment, the second roller 520B is a motorized roller that pulls (e.g., feed or dispense) the first web 102 as the first roller systems 521A feeds the first web 102 from the first roll 501. The first roller 520A is a fixed roller that guides and prepares the first web 102 to be pulled by the second roller 520B. In the depicted embodiment, the sixth roller 520F is a motorized roller that pulls (e.g., feed or dispense) the second web 104 as the second roller systems 521B feeds the second web 104 from the second roll 502. The fifth roller 520E is a fixed roller that guides and prepares the second web 104 to be pulled by the sixth roller 520F.

The system 500 may also include dancers 522 (e.g., 522A-E) to maintain a consistent tension in the first web 102, the second web 104, and the layered webs 510. Each dancer 522 may include an idler roller mounted to a dancer arm and a sensor to detect a position of the idler roller. For example, the dancer arm may include any one of a potentiometer, encoder, or angle sensor to sense an angle of the dancer arm. The sensed angle is compared to a set or "zero" position to detect if the idler roller position has changed and a rotation speed of a roller 520 may be adjusted until the sensed angle returns to the set position. For example, in the depicted embodiment, the first dancer 522A may rotate clockwise or counterclockwise if there is too little or too much tension in the first web 102. The rotation speed of the second roller 520B may then be increased or decreased to return the dancer 522A to the set position shown on the page.

The plurality of fabric preparation systems 526 (e.g., fabric preparation systems 526A-D) provide slack in a web 102, 104, 510, 512 which allows the web to sag while traveling through the system 500. The fabric preparation systems 526 prevent stretching or cause relaxation in the webs 102, 104, 510, 512 such that the slack in the webs 102, 104, 510, 512 allows the system 500 to move the webs 102, 104, 510, 512 without stretching, which beneficially helps maintain the webs 102, 104, 510, 512 in a low-tension state. The slack may also relax and reduce wrinkles in the webs 102, 104, 510, 512. Each fabric preparation system 526 may include a motorized roller to pull the respective web 102, 104, 510, 512 and a non-contact measurement sensor 528 (e.g., non-contact measurement sensors 528A-D) to measure the slack or monitor the stretching in a respective web 102, 104, 510, 512. The non-contact measurement sensor 528 may be used to control a rotation speed of the motorized roller such that the motorized roller adjusts a rotation rate based on the non-contact measurement sensor 528. For example, in the third fabric preparation system 526C, which is positioned before the garment station 100, the non-contact measurement sensor 528C may measure a distance (D) between the sensor 528B and the layered webs of fabric 510. If the distance measured is outside a threshold, a rotation speed of a roller 520I be increased or decreased to either increase or decrease the slack in the layered webs of fabric 510. Thus, the plurality of fabric preparation systems 526 use the non-contact measurement sensor 528 to control the motorized rollers to push and pull the web, 102, 104, 510, 512 at such a rate so as to not stretch the web.

As shown in FIG. 5, the layered webs of fabric 510 is fed into the garment station 100 from the third fabric preparation system 526C. The conveyors 150, 152 may be used to pull the layered webs of fabric 510 into the garment station 100. The conveyors 150, 152 may be controlled by the controller 190 to adjust or maintain a web velocity of the layered webs of fabric 510 through the garment station 100. The garment station 100 forms on or more seams patterns in the layered webs of fabric 510 with the first tool head 130 and the second tool head 140 to form a joined webs of fabric 512. In one embodiment, the one or more seam pattern may be formed by ultrasonically welding the webs 102, 104 with the first tool head 330 and the second tool head 340. In one embodiment, the one or more seam patterns may be formed by stitching the webs 102, 104 together using the first tool head 430 and the second tool head 440. The joined webs of fabric 512 includes the one or more seam patterns. The joined webs of fabric 512 are conveyed to the excise station 540 through the fourth fabric preparation system 526D.

The plurality of fabric preparation systems 526 may be coordinated to maintain a throughput of the webs 102, 104 through the system 500, such as maintaining a web velocity, by selectively increasing or decreasing slack. The controller 190 may instruct the third fabric preparation system 526C to increase or decrease slack of the layered webs of fabric 510 upstream of the garment station 100 to facilitate creating on or more seam patterns in the layered webs of fabric 510. For example, the controller 190 may instruct the third fabric preparation system 526C to increase slack in the layered webs of fabric 510 to decrease the throughput of the layered webs of fabric 510 through the garment station 100 to facilitate the creation of one or more seams. The controller 190 may instruct the fourth fabric preparation system 526D to increase or decrease slack of the joined webs 512 upstream of the excise station 540 to facilitate excising garment components from the joined webs 512. For example, the controller 190 may instruct the fourth fabric preparation system 526D to increase slack in the joined webs 512 to decrease the throughput of the joined webs 512 through the excise station 540 to facilitate excising garment components from the joined webs 512. The controller 190 may coordinate the third and fourth fabric preparation systems 526C, 526D to operate the garment station 100 and the excise station 540 at different output rates. The controller 190 may also adjust the belt velocity of the first and second conveyors 150, 152 to control the web velocity through the garment station 100.

The excise station 540 cuts the joined webs 512 to excise one or more garment components (e.g., the first garment component 210 and the second garment component 230) from the joined webs 512 based on the one or more seam patterns (e.g., first seam pattern 220 and the second seam pattern 240) formed in the joined webs 512. In the depicted embodiment, the excise station 540 comprises a cutting device 542. The cutting device 542 may be at least one of a die cutter, kiss cutter, laser cutter, and the like. In some embodiments, the cutting device 542 may be a rotary die cutter. The cutting device 542 may cut along the borders or contours of the garment component to excise (e.g., detach, cut free) the garment component from the joined webs 512. For example, the cutting device 542 may cut the joined webs 512 around the outside of the seam pattern, such as at the edge of the seam pattern, or along an area within the seam pattern. The excise station 540 may also include a conveyor 544 to pull the joined webs of fabric 512 from the fourth fabric preparation system 526D through the excise station 540. The controller 190 may control the rate of throughput of the joined webs of fabric 512 by controlling the belt velocity of the conveyor 544. In some embodiments, the controller 190 commands the cutting device 542 to excise the one or more garment components from the joined webs of fabric 512.

In some embodiments, movement of the webs 102, 104, 510, 512 may be done in a digitized or stepped manner. In some embodiments, the system 500 may momentarily stop moving the webs 102, 104, 510, 512, such as stopping the movement of the layered webs of fabric 510 in the garment station 100 and stopping the joined webs of fabric 512 in the excise station 540. In some embodiments, the system 500 continuously moves the webs 102, 104, 510, 512. For example, the garment station 100 forms one or more seam patterns in the layered webs of fabric 510 as the layered webs of fabric 510 moves through the system and the excise station 540 excises one or more garment components from the joined webs of fabric 512 as the joined webs of fabric 512 moves through the system 500.

After the one or more garment components are excised from the joined webs 512, the garment components may be transferred to a different garment manufacturing system or station for finishing. For example, the garment may be finished by attaching one or more garment components together to form a finished garment. The one or more garment components excised from the joined webs 512 may need to be turned inside out prior to attaching one or more garment components together to form a finished garment. For example, the garment station 100 may form the seam patterns based on an inside out dimensions of the garment component.

In some embodiments, the controller 190 controls the system 500. In some embodiments, the controller 190 is part of a control system that controls the system 500, and the controller 190 controls only the garment station 100.

Figure 6:
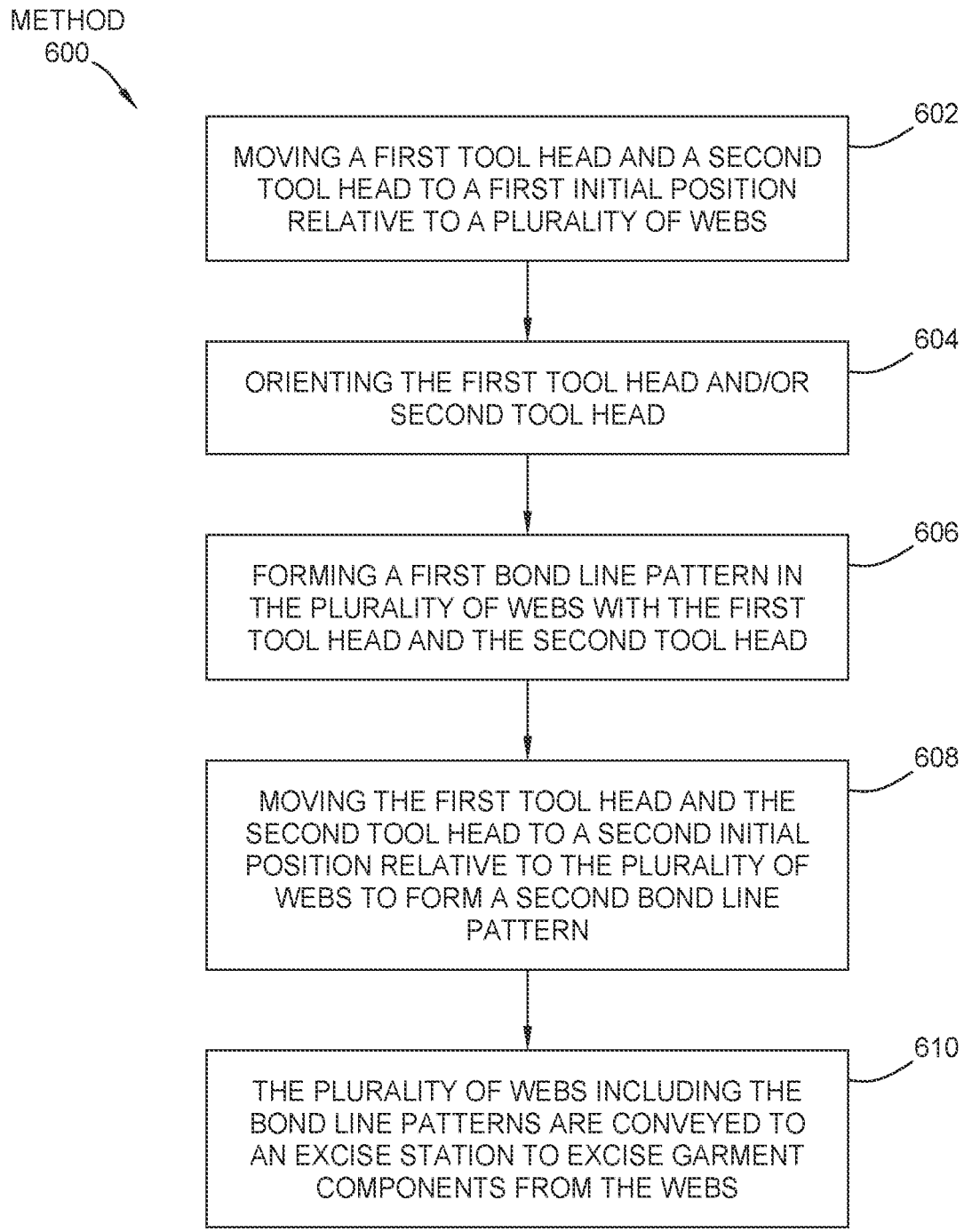
FIG. 6 is a flowchart of a method for an automated manufacturing of seam patterns of garments or garment components.

FIG. 6 is a flowchart of a method 600 for automated manufacturing of seam patterns of garments or garment components. The controller 190 may control the garment station 100 to complete each step of the method. The method 600 may be performed using any of the garment stations described above, or other suitable garment stations.

At operation 602, the controller 190 causes the first tool head to move with the second tool head to a first initial position in preparation to form a seam pattern in layered webs of fabric, such as layered webs of fabric 510 formed from layers of the first web 102 and the second web 104. The first tool head may be any one or more of the first tool heads described above, and the second tool head may be any one or more of the second tool heads described above. The controller 190 may instruct the head carrier 120 to move along the head carrier track 116 to move the first tool head and the second tool head to the first initial position. The controller 190 may instruct the first tool head to move along the first track section 123 and the second tool head to move along the second track section 125 to move the first tool head and the second tool head to the first initial position. The head carrier 120 may move along the head carrier track 116 simultaneously with the first tool head moving along the first track section 123 and the second tool head moving along the second track section 125. In some embodiments, the controller 190 instructs the first conveyor 150 and the second conveyor 152 to move along the conveyor track 118 as the head carrier 120 moves along the head carrier track 116 to position the first tool head and the second tool head in the first initial position. The controller 190 may adjust or maintain a web velocity of the layered webs of fabric as the first tool head and the second tool head are moved to the first initial position.

At operation 604, the controller 190 causes the first tool head and/or the second tool head to be moved to an orientation in preparation to form the seam pattern. The first tool head and/or the second tool head may move to the orientation during, prior to, or after positioning the first tool head and the second tool head in the first initial position. In some embodiments of method 600, the operation 604 is omitted.

At operation 606, the controller 190 causes the first tool head and the second tool head to form the seam pattern. The seam pattern may be a pre-programmed seam pattern stored in the controller 190. The seam pattern may be selected based on the size and/or type of desired garment component, such as the body of a small t-shirt. The controller 190 may coordinate the movement of the head carrier 120 along the head carrier track 116, the movement of the first tool head along the first track section 123, and the movement of the second tool head along the second track section 125 to form the seam pattern. The controller 190 instructs the conveyors 150, 152 to move along the conveyor track 118 as the head carrier 120 moves along the head carrier track 116. The controller 190 may adjust or maintain a web velocity of the layered webs of fabric as the first tool head and the second tool head form the seam pattern.

The seam pattern may include a plurality of seams. The controller 190 may instruct the first tool head and the second tool head to form each seam of the seam pattern in sequence. For example, the first tool head and the second tool head may be moved synchronously to the first initial position to form the first seam of the seam pattern. The controller 190 may cause the first tool head and/or the second tool head to move to an orientation to form the first seam. After the first seam is formed, the controller 190, the first tool head and the second tool head may be moved synchronously to a second position to form a second seam of the seam pattern. The controller 190 may cause the first tool head and/or the second tool head to move to an orientation to form the second seam.

In some embodiments, the first tool head and/or the second tool head maintain an orientation while forming a seam of the seam pattern. In some embodiments, the controller instructs the first tool head and/or the second tool head to move between orientations while forming a seam of the seam pattern. For example, the controller 190 may coordinate the orientation of the first tool head 130 and/or the second tool head 140 to form a non-linear seam. In some embodiments, the first and second tool heads do not change an orientation to form a linear or a non-linear seam.

At operation 608, the controller 190 causes the head carrier 120, the first tool head and the second tool head to move synchronously to a second initial position in preparation to form an additional seam pattern in the layered webs. In some embodiments, the controller 190 moves the head carrier 120 along the head carrier track 116 in coordination with the first and second conveyors 150, 152 along the conveyor track 118 to move the first tool head and the second tool head to the second initial position. The additional seam pattern may be formed by repeating the method as discussed above with respect to operations 602 and 606. The additional seam pattern may be for the same size and type of desired garment component, or the next seam pattern may be for a different size and/or type of desired garment component. For example, the additional seam pattern may be for a body of a large t-shirt while the prior seam pattern may be for a body of a small t-shirt.

At operation 610, the one or more seam patterns formed in the layered webs of fabric, such as the joined webs of fabric 512, are conveyed for additional processing. The joined webs of fabric 512 may be conveyed to an excise station 540. One or more garment components may be excised from the joined webs of fabric 512 based on the one or more seam patterns. The excised garment component includes a seam pattern formed by the garment station 100.

In some embodiments, an operator may select the size and type of a desired garment component using a user interface of the controller 190. The seam pattern may be a pre-programmed pattern based on a desired size and type of the garment component. For example, an operator may choose between a small, medium, and large t-shirt body using a user interface of the controller 190. The operator may instruct the controller 190 to form a seam pattern for a small t-shirt body, then a seam pattern for sleeves for a small t-shirt, then a seam pattern for a large t-shirt body, and then a seam pattern for sleeves of a large t-shirt. The small and large t-shirt body and the small and large t-shirt sleeves may later be excised from the webs of fabric. A small t-shirt may be assembled from the small t-shirt body and small t-shirt sleeves, and a large t-shirt may be assembled from the large t-shirt body and the large t-shirt sleeves.

Figure 7:
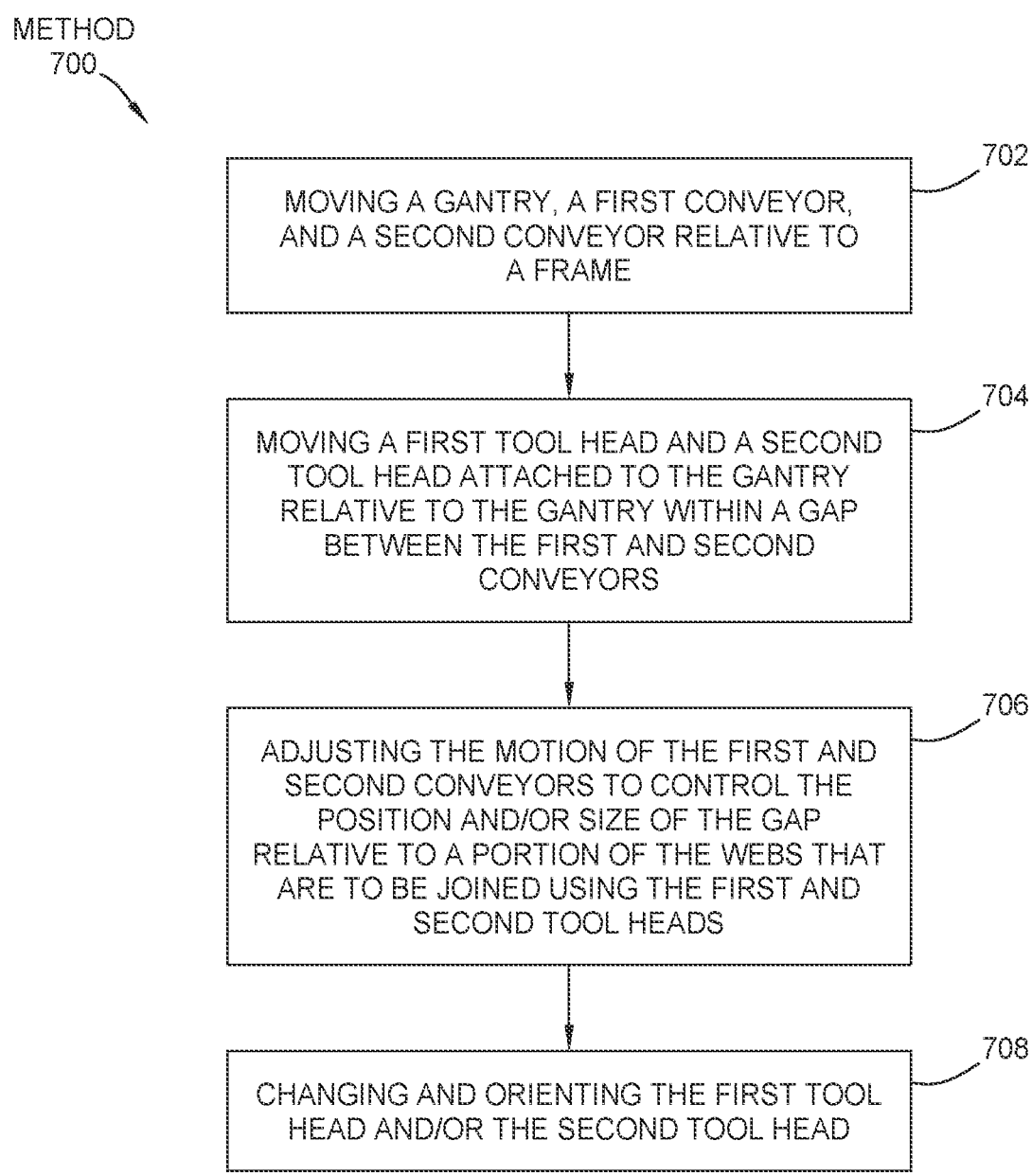
FIG. 7 is a flowchart of a method for automated controlling of the garment station.

FIG. 7 is a flowchart of a method 700 for automated controlling of the garment station 100. The controller 190 may control the garment station 100 to complete each step of the method.

At operation 702, the head carrier 120, and/or one or both of the conveyors 150, 152, are moved relative to the frame 110. The head carrier 120 moves relative to the frame 110 along the head carrier tracks 116 and the conveyors 150, 152 move relative to the frame 110 along the conveyor tracks 118. The movement of the head carrier and conveyors 150, 152 along the respective tracks 116, 118 may be coordinated by the controller to maintain the gap 160 having a sufficient size and motion relative to the frame 110. The size of the gap may be maintained at a distance sufficient for forming a seam to join the webs 102, 104 as the webs are indexed or otherwise moved relative to the frame 110 through the garment station 100. The head carrier 120 may be moved synchronously or asynchronously with the conveyors 150, 152. The head carrier 120 and conveyors 150, 152 may be moved to position the first tool head and second tool head in position to form a seam while the webs 102, 104 temporarily reside in the gap 160 as the webs are moved through the garment station 100. The head carrier 120 and conveyors 150, 152 may be moved to facilitate forming a seam with the first tool head and second tool head. The first tool head may be any one or more of the first tool heads described above, and the second tool head may be any one or more of the second tool heads described above.

At operation 704, the first tool head is moved along the first track section 123 synchronously with the second tool head along the second track section 125. The first tool head and second tool head may be moved along the respective track sections 123, 125 into a position to form a seam or moved to form a seam. In some embodiments, the movement described with respect to operation 704 occurs simultaneously with or before operation 702.

At operation 706, the controller adjusts the motion of the first conveyor 150 and/or the second conveyor 152 to control the position and/or size of the gap 160 relative to a portion of the webs that are to be joined using the first and second tool heads. The controller 190 may adjust the belt velocity to increase, decrease, or maintain the web velocity of the plurality of webs. The controller 190 may adjust the belt velocity of the conveyors 150, 152 based on the movement and displacement velocity of the conveyors 150, 152 along the conveyor tracks 118. The controller 190 may adjust the belt velocity based on the seam pattern, such as reducing the belt velocity to facilitate forming a complicated seam pattern, such as a seam pattern with two or more individual seams, for example. The controller 190 may adjust the belt velocity to reduce or increase the web velocity to facilitate the formation of the seam pattern, such as reducing the web velocity to allow the head carrier 120 to catch up to a position relative to the web. Operation 706 may occur before, after, or simultaneously with operations 702, 704.

At operation 708, the controller 190 causes the first tool head and/or the second tool head to change an orientation. The orientation may be changed before, during, or after forming a seam. The orientation may be selected based on a desired direction of the seam, such as a seam that is formed at a 45 degree angle relative to the centerline of the plurality of web. In some embodiments, the first tool head and/or the second tool head maintain an orientation while forming a seam of the seam pattern. In some embodiments, the controller instructs the first tool head and/or the second tool head to move between orientations while forming a seam of the seam pattern. For example, the controller 190 may coordinate the orientation of the first tool head and/or the second tool head to form a non-linear seam. In some embodiments, the first and second tool heads do not change an orientation to form a linear or a non-linear seam.

The garment station 100 may be used to mass produce a web line with a plurality of like garment components to be excised later to form a single garment, or the garment station 100 may be used in small batch operations to form garment components of various sizes and types.

In some embodiments, the garment station 100 may form one or more seams or seam patterns in layered webs of fabric composed of more than two webs of fabric, such as three or more webs of fabric.

In some embodiments, the first tool head and the second tool head may move independently from one another to form a seam. In other words, the first and second tool heads may move asynchronously to one another.

In an alternative embodiment, the garment station 100 includes only the first tool head attached to the head carrier. The first tool head may include an adhesive dispenser that applies an adhesive to the surface of a first web traveling through the garment station 100. A second web may be placed onto the first web and into contact with the adhesive on the surface of the first web to form a seam between the first and second webs. The second web may be placed onto the first web to form the seam at the garment station 100 or at another suitable station or process downstream from the garment station 100. The adhesive dispenser may be a needle valve, a diaphragm valve, a pneumatic valve, an electro-pneumatic jet valve, a piezoelectric jet valve, a tape dispenser, a liquid adhesive dispenser, or other suitable dispenser. The adhesive may be a heat activated adhesive. The adhesive may also be cured by a moisture treatment, such as exposing the adhesive to moisture.

In an alternative embodiment, the head carrier 120 is moveable relative to the frame 110 by a robot instead of moving along a head carrier track 116. The robot may be coupled to the frame 110 or located adjacent to or above the frame 110. The gap 160 is repositioned in coordination with the robot moving the head carrier 120 relative to the frame 110.

In one example, the first body 121 and the second body 122 are not connected together by a connection member 127. An arm of a first robot may move the first body 121 and the attached first tool head 130 relative to the frame 110 on a first side of the plurality of webs. An arm of a second robot may move the second body 122 and the attached second tool head 140 relative to the frame 110 on a second side of the plurality of webs. The first and second robots may be coordinated by the controller 190 to move the first body 121 and the second body 122 synchronously with each other relative to the frame 110. The gap 160 is repositioned in coordination with first and second robots. Optionally, the arms of the first and second robots may be controlled by a single robot.

In an alternative embodiment of the garment station 100, the head carrier 120 is replace by one or more robots. An arm of a first robot is coupled to the first tool head and an arm of a second robot is coupled to the second tool head. The first tool head is moved to positions below a plurality of webs traveling through the garment station 100 by the first robot. The second tool head is moved to positions above the plurality of webs traveling through the garment station 100 by the second robot. The movement of the arms of the first and second robots may be coordinated to move the first and second tool heads synchronously with each other to one or more positions relative to the plurality of webs. For example, the first and second head may be moved synchronously to maintain an alignment between the first and second tool head to stitch or ultrasonically weld the plurality of webs together. The gap 160 allows the first tool head access to the underside of the plurality of webs without interference of the conveyors 150, 152. The gap 160 is repositioned in coordination with motion of the first and second robots. Optionally, the arms of the first and second robots may be controlled by a single robot.

In an alternative embodiment of the garment station 100, the conveyors 150, 152 are replaced with a different guide. For example, the guide may be a motorized roller, a passive roller, a shaft, or a surface of the frame 110, or other suitable element to support the webs on either side of the gap 160 so that the first tool head may move underneath the webs spanning the gap 160 when forming a seam. The gap 160 is disposed between each guide, and each guide may be moveable to reposition and/or change the size of the gap 160 to facilitate moving the head carrier 120 relative to the webs of fabric. Each guide may be moved in a similar manner as discussed above regarding the conveyors 150, 152 to reposition the gap 160 to accommodate the movement of the carrier head in the direction of the x-axis. For example, the guide may be a non-rotating shaft moved relative to the frame in a track formed in the frame 110, and the webs may slip against the non-rotating shaft as the webs travel across the gap 160. One or more conveyors or rollers outside of the garment station 100 may cause the webs to travel through the garment station 100.

In an alternative embodiment, the frame 110 may be omitted. Each guide, such as the first and second conveyors 150, 152, may be connected to a floor of an assembly line. Each guide is moved to reposition the gap 160. For example, each conveyor 150, 152 may be part of a conveyor assembly that moves the conveyors 150, 152 in the direction of the x-axis to reposition the gap 160. The head carrier 120 may be moved by a robot that is disposed on the floor.

In one embodiment, a garment station includes a first guide separated from a second guide by a repositionable gap, wherein the first guide and/or the second guide are moveable to reposition the gap. The garment station may also include a head carrier disposed between the first guide and the second guide. The garment station may also include a first tool head and a second tool head attached to the head carrier and configured to join webs of fabric disposed across the gap. The head carrier is configured to maintain the first tool head and the second tool head aligned in the gap as the gap moves relative to the frame.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each operation of the flowchart illustrations or block diagrams, and combinations of operations in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the operation(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the operation(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the operation(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each operation in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each operation of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A garment station, comprising:
    a first guide separated from a second guide by a repositionable gap;
    a head carrier disposed between the first guide and the second guide;
    a first tool head and a second tool head attached to the head carrier and configured to join webs of fabric disposed across the gap, wherein the head carrier is configured to maintain the first tool head and the second tool head aligned in the gap as the gap is repositioned; and
    a frame including one or more head carrier tracks and one or more conveyor tracks, wherein the first guide is a first conveyor and the second guide is a second conveyor, and wherein the head carrier moves relative to the frame along the one or more head carrier tracks and the first and second conveyors move relative to the frame along the one or more conveyor tracks.

2. The garment station of claim 1, wherein the first guide is movable relative to the second guide.

3. The garment station of claim 1, further comprising a controller configured to coordinate movement of the head carrier, the first guide, and the second guide, and movement of the first tool head and the second tool head within the gap.

4. The garment station of claim 1, wherein the head carrier further comprises:
    a first body including a first track section, wherein the first tool head is moveable relative to the head carrier along the first track section;
    at least one first roller connected to the first body;
    a second body including a second track section, wherein the second tool head is moveable relative to the head carrier along the second track section;
    at least one second roller connected to the second body; and
    a slot disposed between the first body and the second body.

5. The garment station of claim 1, wherein:
    one of the first tool head and the second tool head is a horn and the other of the first tool head and the second tool head is an anvil.

6. The garment station of claim 1, wherein:
    the first tool head and the second tool head are configured to form a stitch.

7. The garment station of claim 1, wherein the first guide includes a conveyor belt.

8. A system of manufacturing a garment component; including:
    the garment station of claim 1 configured to form a seam pattern joining webs of fabric; and
    an excise station configured to excise a garment component from the webs, wherein the garment component includes the seam pattern.

9. A garment station, comprising:
    a frame;
    a first conveyor movably coupled to the frame;
    a second conveyor movably coupled to the frame and separated from the first conveyor by a repositionable gap;
    a head carrier moveable relative to the frame and disposed in the repositionable gap and including a slot, wherein the first and second conveyors are moveable relative to the frame to reposition the gap in response to the head carrier moving relative to the frame; and
    a first tool head and a second tool head moveably attached to the head carrier on opposing sides of the slot, wherein the first tool head and the second tool head are configured to join webs of fabric disposed across the gap and disposed in the slot as the head carrier moves relative to the frame.

10. The garment station of claim 9, wherein:
    one of the first tool head and the second tool head is a horn and the other of the first tool head and the second tool head is an anvil.

11. The garment station of claim 9, wherein:
    the first tool head and the second tool head are configured to form a stitch.

12. The garment station of claim 9, further comprising a controller configured to coordinate movement of the head carrier, the first conveyor, and the second conveyor, and movement of the first tool head and the second tool head within the gap.

13. A system of manufacturing a garment component; including:
    a garment station configured to form a seam pattern joining webs of fabric, the garment station comprising:
        a first guide separated from a second guide by a repositionable gap;
        a head carrier disposed between the first guide and the second guide; and
        a first tool head and a second tool head attached to the head carrier and configured to join webs of fabric disposed across the gap, wherein the head carrier is configured to maintain the first tool head and the second tool head aligned in the gap as the gap is repositioned; and
    an excise station configured to excise a garment component from the webs of fabric, wherein the garment component includes the seam pattern.

14. The system of claim 13, wherein:
    one of the first tool head and the second tool head is a horn and the other of the first tool head and the second tool head is an anvil.

15. The system of claim 13, wherein:
    the first tool head and the second tool head are configured to form a stitch.

16. The system of claim 13, wherein the second guide is a conveyor, and wherein the second guide includes a conveyor belt.

17. A garment station, comprising:
a first guide separated from a second guide by a repositionable gap;
a first tool head and a second tool head configured to join webs of fabric disposed across the gap; and
a head carrier attached to the first tool head and the second tool head and disposed between the first guide and the second guide, wherein the head carrier is configured to maintain the first tool head and the second tool head aligned in the gap as the gap is repositioned, and wherein the head carrier comprises:
a first body including a first track section, wherein the first tool head is moveable relative to the head carrier along the first track section;
at least one first roller connected to the first body;
a second body including a second track section, wherein the second tool head is moveable relative to the head carrier along the second track section;
at least one second roller connected to the second body; and
a slot disposed between the first body and the second body.

18. The garment station of claim 17, wherein:
one of the first tool head and the second tool head is a horn and the other of the first tool head and the second tool head is an anvil.

19. The garment station of claim 17, wherein:
the first tool head and the second tool head are configured to form a stitch.

20. The garment station of claim 17, wherein the first guide is a conveyor including a conveyor belt, and further comprising a controller configured to coordinate movement of the head carrier, the first guide, and the second guide, and movement of the first tool head and the second tool head within the gap.

* * * * *